(12) United States Patent
Shin et al.

(10) Patent No.: US 10,582,546 B2
(45) Date of Patent: Mar. 3, 2020

(54) METHOD AND DEVICE FOR CONFIGURING CONNECTION OF WIRELESS COMMUNICATION SYSTEM

(71) Applicant: Samsung Electronics Co., Ltd., Suwon-si, Gyeonggi-do (KR)

(72) Inventors: Bong-Jhin Shin, Suwon-si (KR); Han-Su Kang, Seoul (KR); Chil-Youl Yang, Anyang-si (KR); Myoung-Hwan Lee, Suwon-si (KR); Chun-Ho Lee, Suwon-si (KR); Tae-Young Lee, Seoul (KR); Jae-Eun Kang, Suwon-si (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/030,750

(22) PCT Filed: Oct. 20, 2014

(86) PCT No.: PCT/KR2014/009832
§ 371 (c)(1),
(2) Date: Apr. 20, 2016

(87) PCT Pub. No.: WO2015/060597
PCT Pub. Date: Apr. 30, 2015

(65) Prior Publication Data
US 2016/0255663 A1   Sep. 1, 2016

(30) Foreign Application Priority Data

Oct. 21, 2013  (KR) .................. 10-2013-0125491
Sep. 3, 2014   (KR) .................. 10-2014-0116966

(51) Int. Cl.
*H04W 76/10*      (2018.01)
*H04W 4/08*       (2009.01)
(Continued)

(52) U.S. Cl.
CPC ............ *H04W 76/10* (2018.02); *H04W 4/08* (2013.01); *H04W 8/005* (2013.01); *H04W 36/08* (2013.01);
(Continued)

(58) Field of Classification Search
None
See application file for complete search history.

(56) References Cited

U.S. PATENT DOCUMENTS

2006/0029002 A1   2/2006  Park et al.
2008/0151759 A1*  6/2008  Yamada ................. H04L 45/00
                                                    370/238
(Continued)

FOREIGN PATENT DOCUMENTS

KR    10-2006-0045776 A    5/2006
KR    10-2009-0092976 A    9/2009
(Continued)

OTHER PUBLICATIONS

Jae Seung Lee, IEEE 802. 11-12_0572R1, Selective transmission of the Probe Response for 11ai Spec Framework, May 4, 2012.
(Continued)

*Primary Examiner* — Chi H Pham
*Assistant Examiner* — Raul Rivas
(74) *Attorney, Agent, or Firm* — Jefferson IP Law, LLP

(57) ABSTRACT

Embodiments of the present invention provide a method and apparatus for easily and quickly connecting wireless devices in a wireless communication system. A method by which at least one center node operates in a wireless communication system containing a group formed by the center node includes sensing two or more target nodes which request for a connection to the group within a predetermined time and sequentially configuring a connection of the target nodes to the group.

17 Claims, 23 Drawing Sheets

(51) Int. Cl.
*H04W 8/00* (2009.01)
*H04W 36/08* (2009.01)
*H04W 36/24* (2009.01)
*H04W 48/16* (2009.01)
*H04W 48/14* (2009.01)
*H04W 84/12* (2009.01)

(52) U.S. Cl.
CPC ........... *H04W 36/24* (2013.01); *H04W 48/16* (2013.01); *H04W 48/14* (2013.01); *H04W 84/12* (2013.01)

(56) References Cited

U.S. PATENT DOCUMENTS

| 2009/0122778 | A1 | 5/2009 | Lee et al. |
| 2009/0290518 | A1* | 11/2009 | Gossain ................ H04L 1/0026 370/310 |
| 2011/0038252 | A1 | 2/2011 | Chung et al. |
| 2012/0158981 | A1 | 6/2012 | Desai et al. |
| 2013/0150115 | A1 | 6/2013 | Maggenti et al. |
| 2013/0227152 | A1 | 8/2013 | Lee et al. |
| 2013/0252656 | A1* | 9/2013 | Lee ....................... H04W 76/14 455/519 |

FOREIGN PATENT DOCUMENTS

| KR | 10-2009-0114007 A | 11/2009 |
| KR | 10-2013-0107617 A | 10/2013 |

OTHER PUBLICATIONS

European Office Action dated Oct. 15, 2019, issued in European Application No. 14855434.8.

\* cited by examiner

*41*

| Order | Information | Notes |
|---|---|---|
| 1 | SSID | If dot11MeshActivated is true, the SSID element is the wildcard value as described in 8.4.2.2. |
| 2 | Supported rates | |
| 3 | Request information | The Request element is optionally present if dot11MultiDomainCapabilityActivated is true. |
| 4 | Extended Supported Rates | The Extended Supported Rates element is present if there are more than eight supported rates, and is optionally present otherwise. |
| 5 | DSSS Parameter Set | The DSSS Parameter Set element is present Within Probe Request frames generated by STAs using Clause 16, Clause 17, or Clause 19 PHYs if dot11RadioMeasurementActivated is true. The DSSS Parameter Set element is present Within Probe Request frames generated by STAs using a Clause 20 PHY in the 2.4 GHz band if dot11RadioMeasurementActivated is true.<br><br>The DSSS Parameter Set element is optionally present Within Probe Request frames generated by STAs using Clause 16, Clause 17, or Clause 19 PHYs if dot11RadioMeasurementActivated is false. The DSSS Parameter Set element is optionally present Within Probe Request frames generated by STAs using a Clause 20 PHY in the 2.4 GHz band if dot11RadioMeasurementActivated is false. |
| 6 | Supported Operating Classes | The Supported Operating Classes element is present if dot11ExtendedChannelSwitchActivated is true. |
| 7 | HT Capabilities | The HT capabilities element is present when dot11HighThroughputOptionImplemented attribute is true. |
| 8 | 20/40 BSS Coexistence | The 20/40 BSS Coexistence element is optionally present when the dot112040BSSCoexistenceMAnagementSupport attribute is true. |
| 9 | Extended Capabilities | The Extended Capabilities element is optionally present if any of the fields in this element are nonzero. |
| 10 | SSID List | The SSID List element is optionally present if dot11MgmtOptionChannelUsageActivated is true. |
| 11 | Channel Usage | The Channel Usage element is optionally present if dot11MgmtOptionChannelUsageActivated is true. |
| 12 | Interworking | The Interworking element is present if dot11InterworkingService Activated is true. |
| 13 | Mesh ID | The Mesh ID element is present if dot11MeshActivated is true. |
| 14 | Vendor Specific | One or more Vendor-specific elements are optionally present. These elements follow all other elements. |

FIG.5B

METHOD AND DEVICE FOR CONFIGURING CONNECTION OF WIRELESS COMMUNICATION SYSTEM

TECHNICAL FIELD

The present invention relates to a connection configuration of a wireless communication system.

BACKGROUND ART

With the development of wireless communication techniques, there is an explosive increase in the use of a device supporting wireless communications. For example, with the development of a Wireless Local Area Network (WLAN) technique, there is an increase in the use of a Wireless Fidelity (Wi-Fi) device employing so called a 'Wi-Fi technique' supporting WLAN-based communications. A WLAN system is a system in which wireless devices located in a specific area share resources. Since the wireless devices located in the specific area is increased in number, there is a need to connect the devices more easily and quickly.

DISCLOSURE

Technical Problem

Accordingly, exemplary embodiments of the present invention provide a method and apparatus for easily and quickly connecting wireless devices in a wireless communication system.

Exemplary embodiments of the present invention provide a method and apparatus for easily and quickly connecting a plurality of wireless devices in a Wireless Local Area Network (WLAN) system.

Exemplary embodiments of the present invention provide a method and apparatus for minimizing an operation performed by a user when connecting a plurality of wireless devices in a WLAN system.

Exemplary embodiments of the present invention provide a method and apparatus for minimizing an operation performed by a user when connecting a plurality of wireless devices and for minimizing a time required in the connection in a WLAN system.

Exemplary embodiments of the present invention provide a method and apparatus for configuring a network having an optimal performance when a service area is extended with a multi-hop network topology in a WLAN system.

Exemplary embodiments of the present invention provide a method and apparatus for minimizing network traffic in a situation where a plurality of wireless devices simultaneously transmit data and forward the data in a multi-hop manner in a WLAN system.

Technical Solution

According to one exemplary embodiment of the present invention, a method of operating at least one center node in a wireless communication system containing a group formed by the center node includes sensing two or more target nodes which requests for a connection to the group within a predetermined time, and sequentially configuring a connection of the target nodes to the group.

According to another exemplary embodiment of the present invention, a method of operating each of two or more target nodes which request for a connection to a group formed by at least one node within a predetermined time in a wireless communication system containing the group includes discovering at least one node of the group located in a predetermined transmission area, and if the at least one node of the group is discovered, attempting the connection to the group via the discovered node, wherein the target nodes are sequentially configured for the connection to the group.

According to another exemplary embodiment of the present invention, a method of operating a normal node in a wireless communication system containing a group formed by one center node and at least one normal node includes receiving a request for a connection to the group from at least one target node located within a predetermined transmission area, and configuring a connection of the target node to the group through communications with the center node.

According to another exemplary embodiment of the present invention, an apparatus of at least one center node in a wireless communication system containing a group formed by the center node includes a communication module for receiving a request for a connection to the group by two or more target nodes within a predetermined time, and a processor for sequentially configuring a connection of the target nodes to the group.

According to another exemplary embodiment of the present invention, an apparatus of each of two or more target nodes which request for a connection to a group formed by at least one node within a predetermined time in a wireless communication system containing the group includes a communication module, and a processor for discovering at least one node of the group located in a predetermined transmission area, and if the at least one node of the group is discovered, attempting the connection to the group via the discovered node, wherein the target nodes are sequentially configured for a connection to the group.

According to another exemplary embodiment of the present invention, an apparatus of at least one normal node in a wireless communication system containing a group formed by one center node and the normal node includes a communication module for receiving a request for a connection to the group from at least one target node located within a predetermined transmission area, and a processor for configuring a connection of the target node to the group through communications with the center node.

Advantageous Effects

Exemplary embodiments of the present invention provide convenience in that, when a wireless communication system configures a connection of a plurality of wireless devices (or nodes), the connection configuration is automatically achieved by only performing triggering for the connection configuration by a user. Further, since there is no need to wait for a predetermined time (i.e., a walk time) for each target node when configuring a connection of two or more target nodes within the predetermined time, it is possible to decrease a time required when configuring the connection of the two or more target nodes. Furthermore, when configuring a network by connecting the plurality of wireless devices in a multi-hop manner, the connection configuration may be achieved by only triggering any device in a network group. In addition, by considering the number of currently connected nodes and the number of hops from a center node or a source node in a process of selecting a node to be connected from among discovered nodes, all terminals can receive a service reliably in a multi-hop network.

DESCRIPTION OF DRAWINGS

The above and other aspects, features and advantages of certain exemplary embodiments of the present invention will

FIG. 5A to FIG. 5C illustrate a frame format of a connection configuration message for a connection configuration operation according to an exemplary embodiment of the present invention;

BEST MODE

In the present patent specification, FIG. 1 to FIG. 18 used to describe principles of the present invention are for exemplary purposes only, and thus it should not be interpreted as being intended for limiting a scope of the invention. Those ordinarily skilled in the art may understand that the principles of the present invention can be implemented in any wireless communication system properly arranged.

Exemplary embodiments of the present invention described below relate to a method capable of more quickly connecting wireless devices in a wireless communication system. Although it will be described by taking an example in which the exemplary embodiments of the present invention are applied to a Wireless Local Area Network (WLAN) system, the present invention is not limited thereto. The WLAN system may be an Institute of Electrical and Electronics Engineers (IEEE) 802.11-based WLAN system or a Wireless Fidelity (Wi-Fi) system based on Wi-Fi Alliance. Representative examples of a wireless device employing a Wi-Fi system described below include a WLAN Access Point (AP), a smart phone, and a smart home appliance, but the present invention is not limited thereto. For example, the wireless device may include one or more of a WLAN AP, a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a speaker, a camera, a wearable device, an electronic clock, a wrist watch, a refrigerator, an air conditioner, a cleaner, an artificial intelligent robot, a TeleVision (TV), a Digital Video Disk (DVD) player, an audio, an oven, a microwave oven, a washing machine, an air purifier, a medical device (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship, avionics, a security device, and a camcorder, game consoles.

Figure 1:
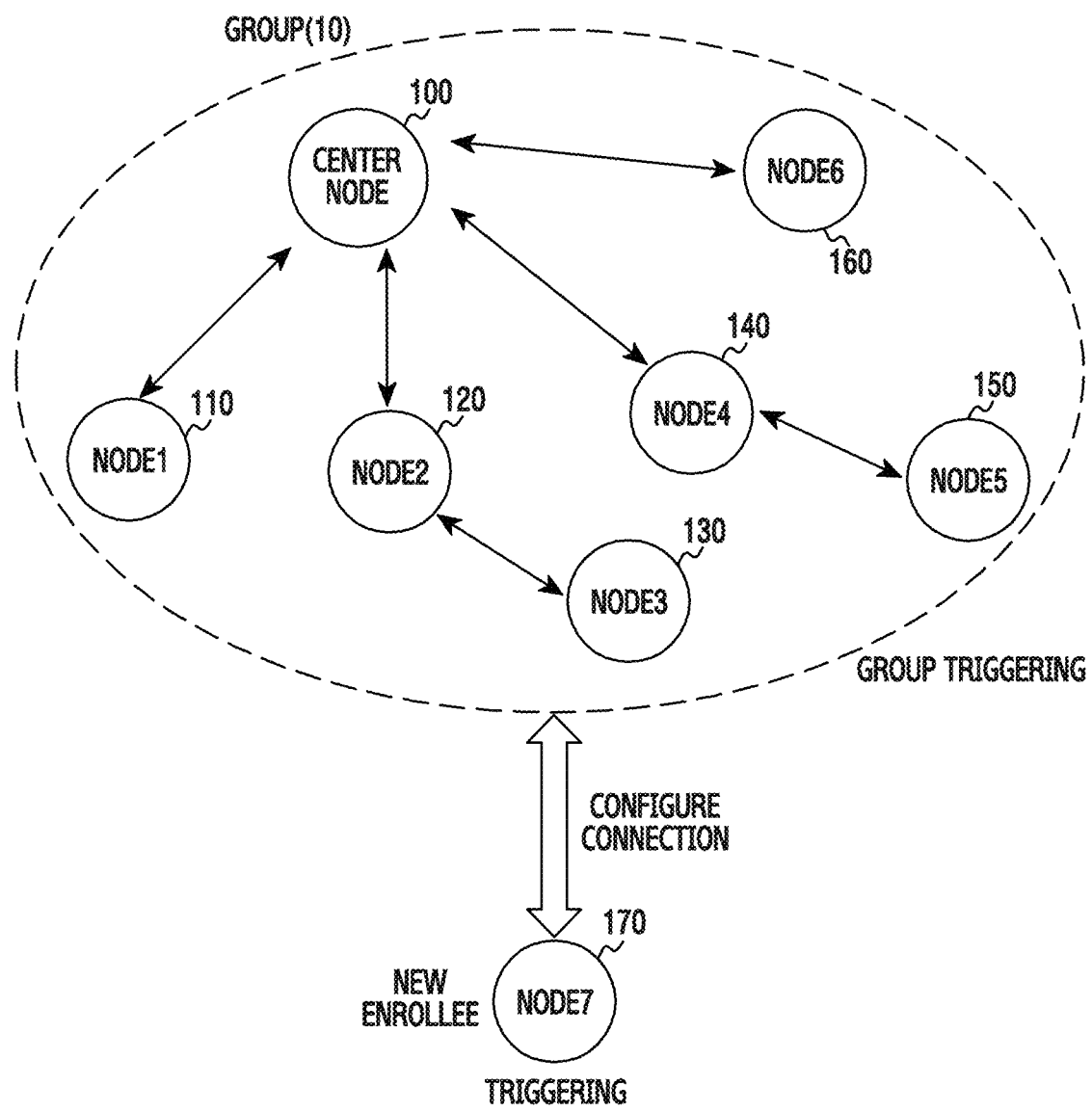
FIG. 1 illustrates a structure of a wireless communication system according to an exemplary embodiment of the present invention.

FIG. 1 illustrates a structure of a wireless communication system according to an exemplary embodiment of the present invention. The structure of FIG. 1 is for exemplary purposes only, and thus other structures may also be used without departing from the scope of the present invention.

Referring to FIG. 1, the wireless communication system includes a network group 10 constructed of a center node 100 and nodes 110 to 160 located in specific areas, and includes a node7 170 as a new enrollee which attempts to configure a connection to the network group 10.

The nodes 110 to 160 have already been configured for a connection to the center node 100 to form the network group 10. The node1 110 is configured for a connection directly to the center node 100. The node2 120 is configured for a connection directly to the center node 100. The node4 140 is configured for a connection directly to the center node 100. The node6 160 is configured for a connection directly to the center node 100. The node3 130 is configured for a connection to the center node 100 via the node2 120. The node5 is configured for a connection to the center node 100 via the node4 140.

As the new enrollee, the node7 170 is configured for a connection to the network group 10 by using a group join scheme. The group join scheme is a connection scheme which is extended to support not only a 1:1 connection but also a 1:N connection. When the user triggers the node 170 and any node of the network group 10, the group 10 is entirely changed to a triggering state, and an operation of configuring a connection to the node 170 is performed through any node selected from the group 10 in this state. For example, if the node 170 and the center node 100 of the network group 10 are triggered, the operation of configuring the connection to the node 170 is performed. For another example, when another node is triggered other than the node 170 and the center node 100 of the network group 10, the operation of configuring the connection to the node 170 is performed. The operation of configuring the connection to the node 170 is performed through one node selected from among the nodes included in the network group 10 and located in a predetermined transmission area (e.g., 1 hop) from the node 170. For example, if there are a plurality of nodes in the transmission area, a node having the greatest received signal strength may be selected. A node selected for a connection configuration operation may be identical to or different from a node triggered for a connection configuration. As such, the network group 10 is a network constructed of multi-hops. Although it is assumed that the node 170 is a node separated by 2 or more hops from the center node 100, the operation of configuring the connection to the node 170 is performed through any one node included in the group 10.

In one exemplary embodiment, the wireless communication system of FIG. 1 may be a Wi-Fi system based on Wi-Fi Alliance. In this case, the nodes 100 to 170 are wireless devices supporting a Wi-Fi technique. For example, the center node 100 is an AP, and the nodes 110 to 170 are nodes of a normal wireless device.

As a triggering method of configuring the connection to the node 170, a Wi-Fi Protected Setup (WPS) (or Wi-Fi simple configuration) technique may be used as one of methods of connecting a Wi-Fi device to the AP in the Wi-Fi system. The Wi-Fi WPS is a technique included in a Wi-Fi Alliance standard as a technique developed for the purpose of easily creating a protected connection through Wi-Fi. The WPS technique includes a Personal Identification Number (PIN) input scheme, a Push Button Configuration (PBC) scheme, a Near Field Communication (NFC) scheme, and a Universal Serial Bus (USB) scheme. In one exemplary embodiment, the PBC scheme may be used to configure a connection according to the exemplary embodiment of the present invention. The PBC scheme is a scheme in which a user pushes a connection button of the device to configure a connection thereto.

Returning to FIG. 1, according to the exemplary embodiment of the present invention, the plurality of Wi-Fi devices (or nodes) 110 to 160 are connected to one AP (or register) 100 to form one group 10. In this case, the nodes 110 to 160 may be connected to the AP 100 in a multi-hop manner. For example, the nodes 110, 120, 140, and 160 are connected to the AP 100 in a 1-hop manner. For another example, the nodes 130 and 150 are connected to the AP 100 in a 2-hop manner.

In the presence of the new node 170 to be connected to the AP 100, PBC triggering may be performed on the new node 170 and any node among members of the network group 10 to configure a connection. If the PBC-triggering is performed on even one of the group members, the group 10 is entirely changed to a PBC triggering state. In a state where the group 10 is PBC-triggered, the new node 170 selects one node located in a transmission area (e.g., 1 hop) from among the group members, and is connected to the selected node (or a relay node) through PBC. The new node 170 acquires information regarding the AP 100 through the relay node, and transmits a group information request message to the AP 100 through the acquired information. Upon receiving the group information request message, the AP 100 knows that the new node 170 joins this group, and the AP 100 updates a group information list managed by the AP 10 to include the new node 170. Thereafter, the AP 100 delivers the updated group information list to all groups.

Figure 2A:
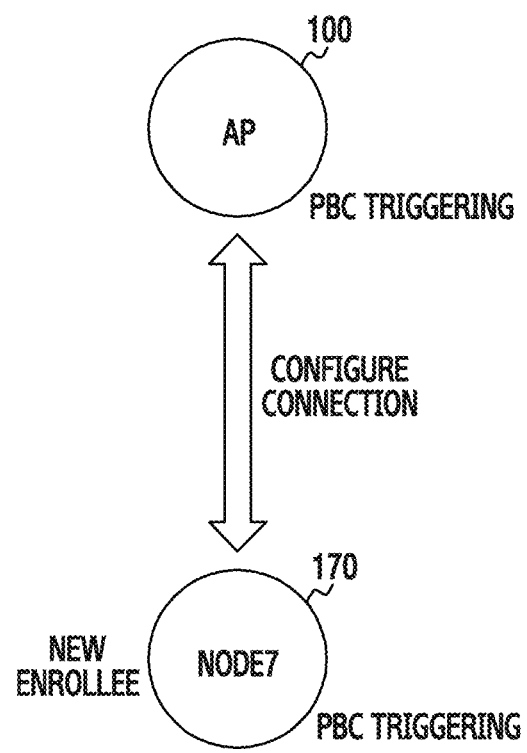
FIG. 2A to FIG. 2C illustrate examples of a connection configuration operation according to an exemplary embodiment of the present invention.
Figure 2B:
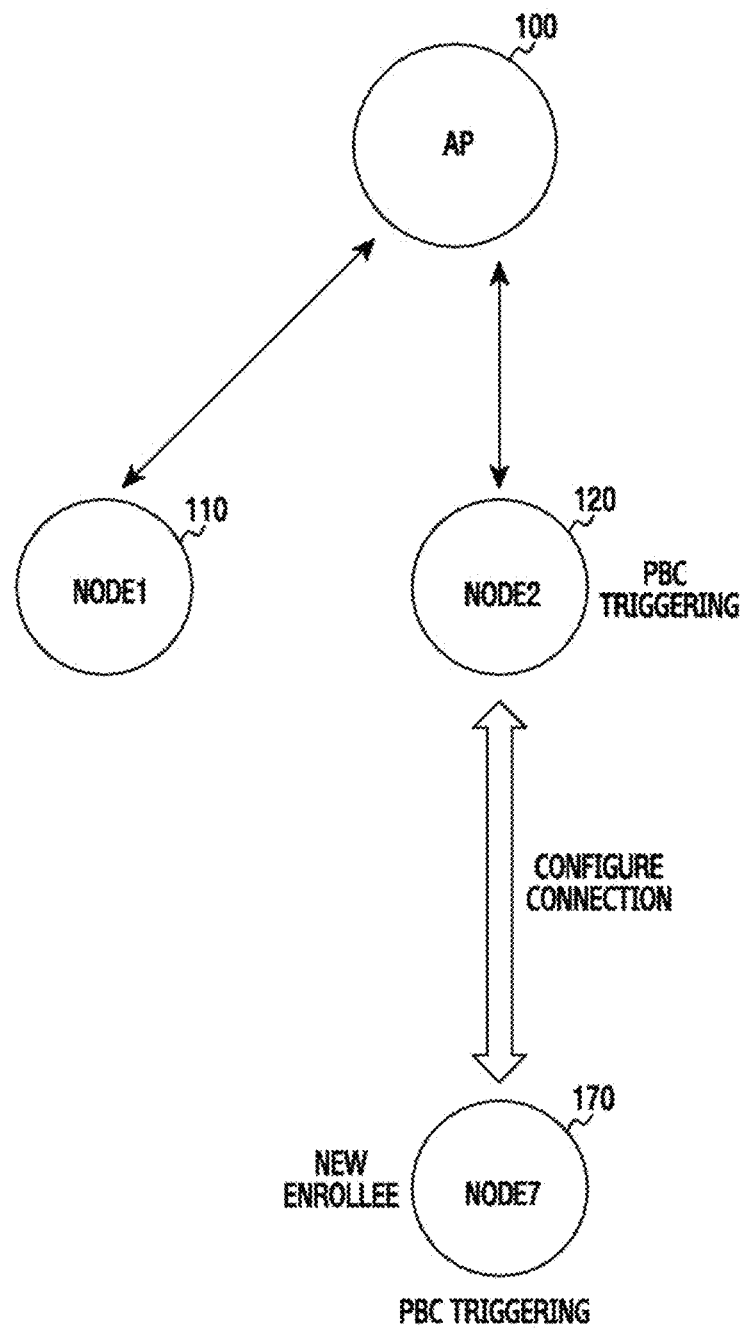
Figure 2C:
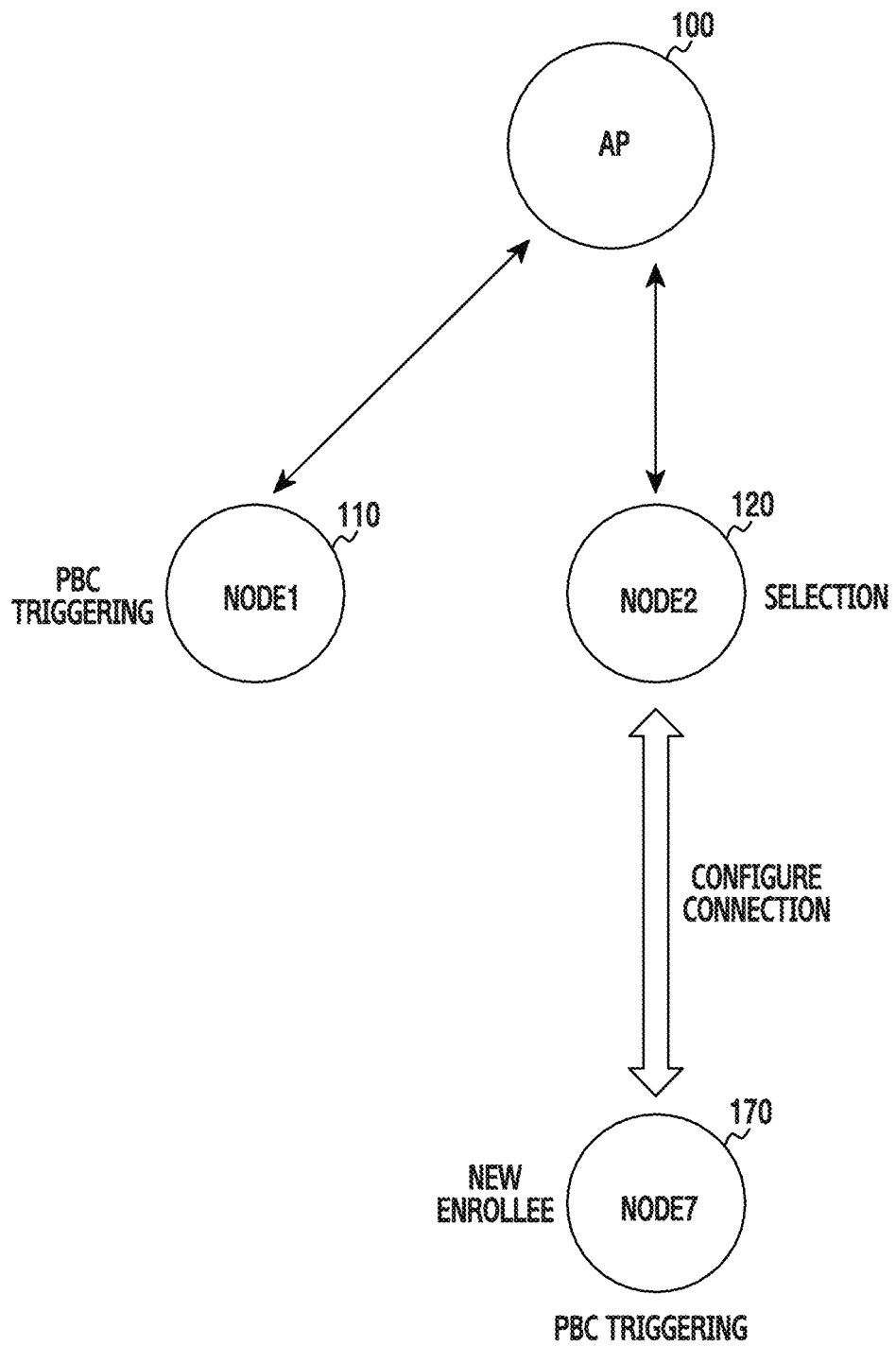

FIG. 2A to FIG. 2C illustrate examples of a connection configuration operation according to an exemplary embodiment of the present invention.

Referring to FIG. 2A, when a target node 170 to be newly enrolled and an AP 100 are PBC-triggered, the target node 170 is configured for a connection directly to the AP 100. In this case, it is assumed that the AP 100 is located within a predetermined transmission area (e.g., 1-hop) from the target node 170.

Referring to FIG. 2B, when a target node 170 to be newly enrolled and a node 120 are PBC-triggered, the target node 170 is configured for a connection to an AP 100 via the node 120. The node2 120 functions as a relay node. In this case, it is assumed that the node 120 is located within a predetermined transmission area (e.g., 1-hop) from the target node 170.

Referring to FIG. 2C, when a target node 170 to be newly enrolled and a node 110 are PBC-triggered, the target node 170 is configured for a connection to an AP 100 via a selected node 120. The node 120 functions as a relay node. In this case, it is assumed that the node 120 is located within a predetermined transmission area (e.g., 1-hop) from the target node 170. A case where the PBC-triggered node is identical to the node selected to configure a connection is shown in FIG. 2A and FIG. 2B, whereas a case where the PBC-triggered node is different from the node selected to configure the connection is shown in FIG. 2C. In one exemplary embodiment, if a center node (e.g., an AP) is discovered from among nodes located in the predetermined transmission area, the center node is selected as the target node 170. In another exemplary embodiment, if the center node is not discovered from among the nodes located in a transmission area from the target node 170, a node having the greatest reception signal strength is selected as the target node 170. In another exemplary embodiment, if the AP is not discovered from among the nodes located in the transmission area, any one node is selected as the target node 170 by considering the number of nodes currently connected among the nodes located in the transmission area and the number of hops from the center node. In another exemplary embodiment, if the AP is not discovered from among the nodes located in the transmission area, any one node is selected as the target node 170 by considering the number of nodes currently connected among the nodes located in the transmission area and the number of hops from a source node.

Figure 3A:
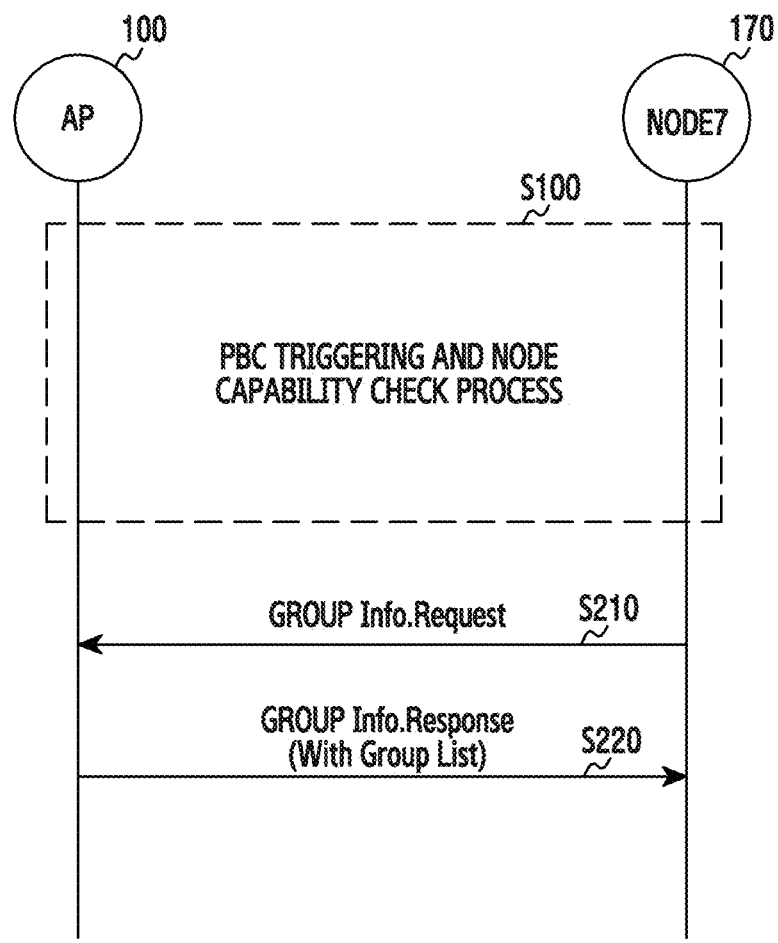
FIG. 3A and FIG. 3B illustrate a handling process between nodes for a connection configuration operation according to an exemplary embodiment of the present invention.
Figure 3B:
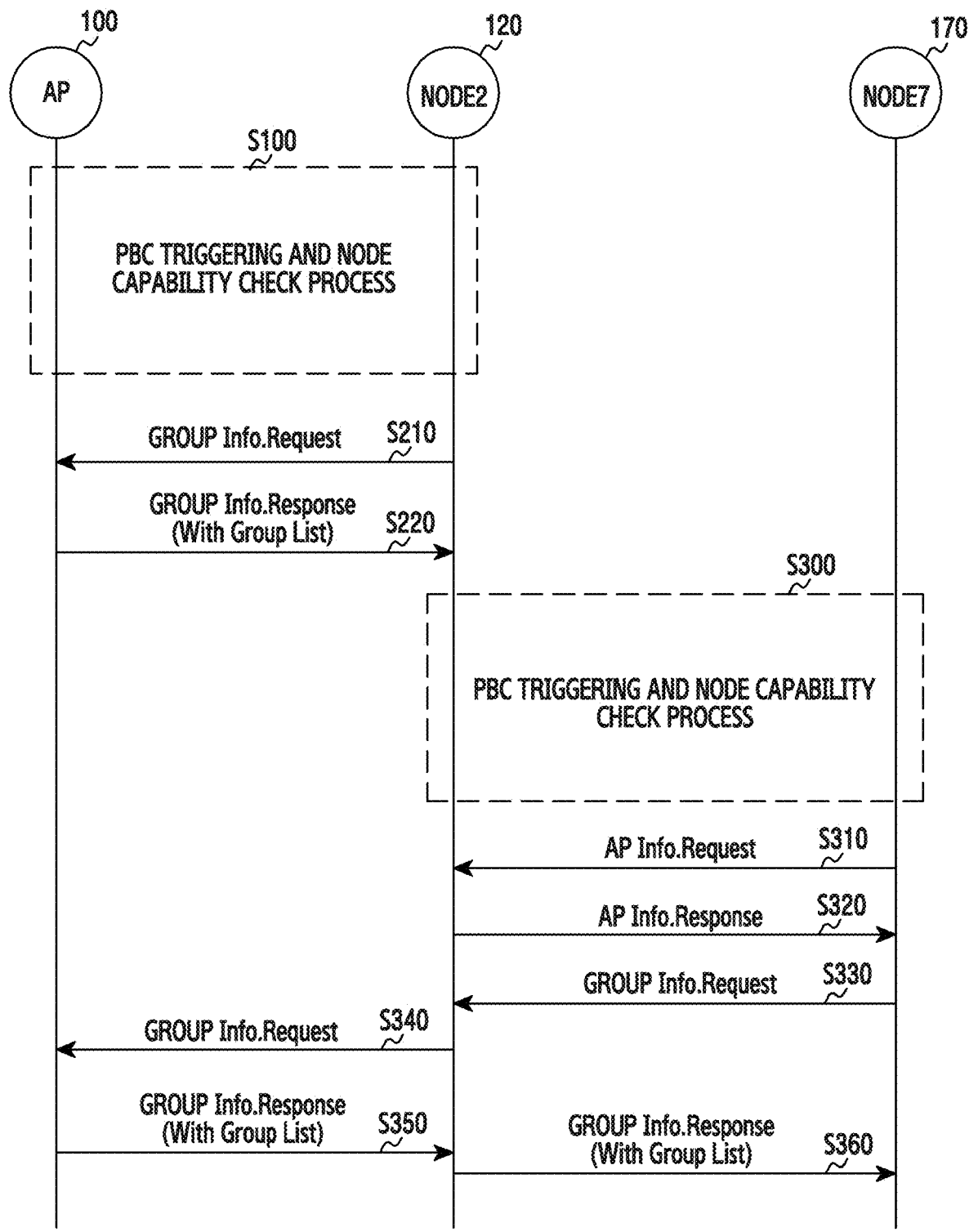

FIG. 3A and FIG. 3B illustrate a handling process between nodes for a connection configuration operation according to an exemplary embodiment of the present invention. Flows of FIG. 3A and FIG. 3B are for exemplary purposes only, and thus other flows may also be used without departing from the scope of the present invention. FIG. 3A illustrates a process of configuring a connection between a node 170 and an AP 100 when the node 170 and the AP 100 are PBC-triggered. This process corresponds to an example of FIG. 2A. FIG. 3B illustrates a process of configuring a connection of a node 170 to an AP 100 via a node 120 when the node 170 and the node 120 are PBC-triggered. This process corresponds to an example of FIG. 2B.

Referring to FIG. 3A, in step S100, the AP 100 and the node 170 perform a PBC triggering and node capability check process. In step S210, the node 170 transmits a group information request message (Group Info. Request) to the AP 100. Upon receiving the Group Info. Request, the AP 100 recognizes that it is requested that the node 170 is configured for a connection to a group, and updates a group information list by adding the node 170 to the group information list. In step S220, the AP 100 transmits to the node 170 a group information response message (Group Info. Response) including the updated group information list. The Group Info. Response is transmitted simultaneously to not only the node 170 as a new enrollee but also nodes as old enrollees located within a predetermined transmission area (e.g., 1-hop) from the AP 100.

Referring to FIG. 3B, in step S100, the AP 100 and the node 120 perform a PBC triggering and node capability check process. In step S210, the node 120 transmits a group information request message (Group Info. Request) to the AP 100. Upon receiving the Group Info. Request, the AP 100 recognizes that it is requested that the node 120 is configured for a connection to a group, and updates a group information list by adding the node 120 to the group information list. In step S220, the AP 100 transmits to the node 120 a group information response message (Group Info. Response) including the updated group information list. The Group Info. Response is transmitted simultaneously to not only the node 120 as a new enrollee but also nodes as old enrollees.

Next, in step S300, the node 120 and the node 170 perform a PBC triggering and node capability check process. In step S310, the node 170 transmits to the node 120 an AP information request message (AP info. Request). In step S320, the node 120 transmits to the node 170 an AP information response message (AP Info. Response) including information regarding the AP. Accordingly, the node 170 acquires AP information via the node 120.

Next, in step S330, the node 170 transmits to the node 120 a group information request message (Group Info. Request). Upon receiving the Group Info. Request, in step S330, the node 120 transmits to the AP 100 the Group Info. Request. Accordingly, the AP 100 recognizes that it is requested that the node 170 is configured for a connection to a group, and updates a group information list by adding the node 170 to the group information list. In step S350, the AP 100 transmits to the node 120 a group information response message (Group Info. Response) including the updated group information list. The Group Info. Response is transmitted simultaneously to not only the node 120 but also nodes (e.g., the nodes 110, 120, 140, and 160 of FIG. 1) as old enrollees located within a predetermined transmission area (e.g., 1-hop) from the AP 100. Upon receiving the Group Info. Response from the AP 100, in step S360, the node 120 transmits to the node 170 the Group Info. Response including the updated group information list. The Group Info. Response is transmitted simultaneously to not only the node 170 as a new enrollee but also nodes (e.g., the node 130 of FIG. 1) as old enrollees located within a predetermined transmission area (e.g., 1-hop) from the node 120.

Figure 4:
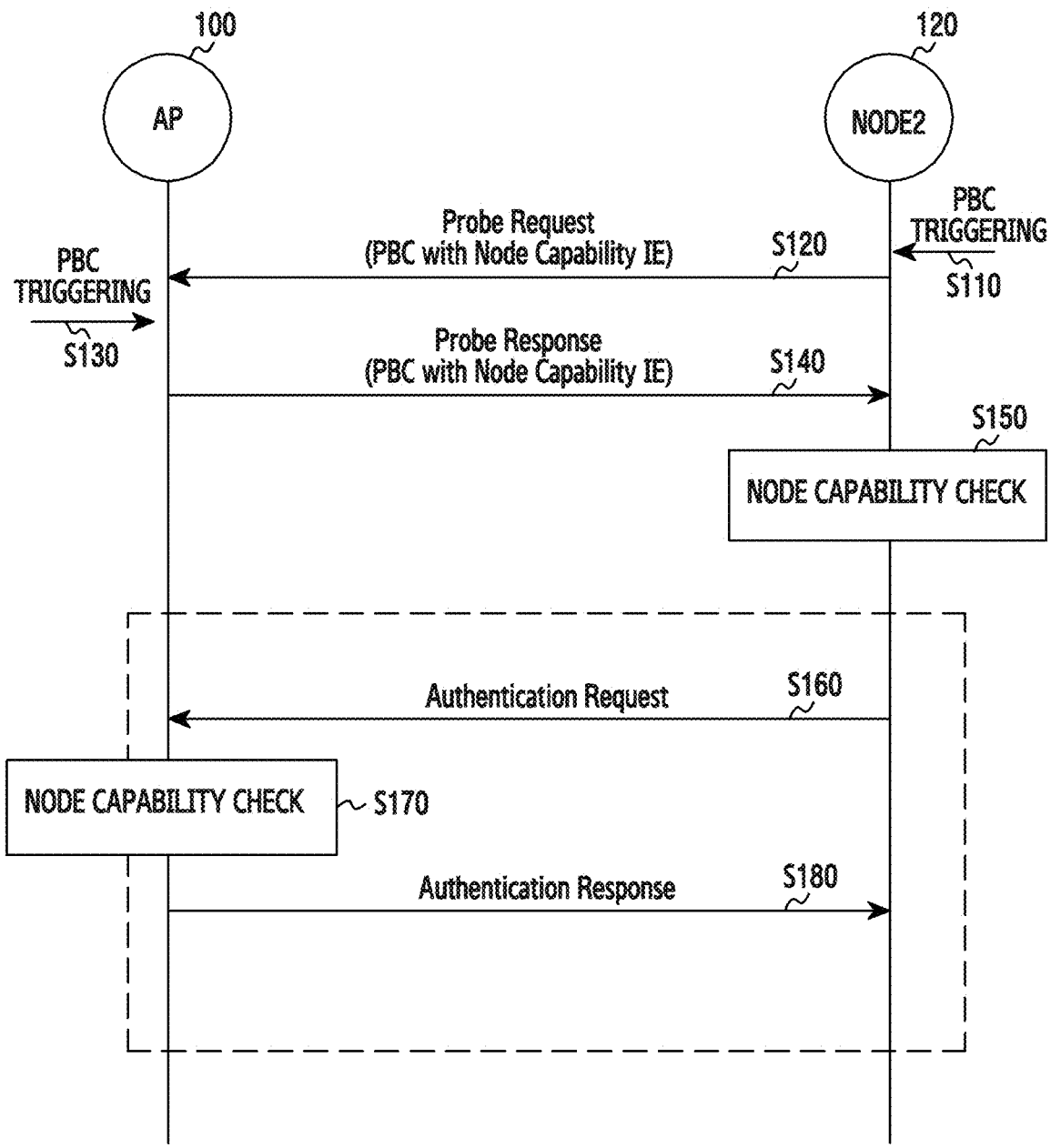
FIG. 4 illustrates a node capability check process for a connection configuration operation according to an exemplary embodiment of the present invention.

FIG. 4 illustrates a node capability check process for a connection configuration operation according to an exemplary embodiment of the present invention. This figure may show a specific flow of the PBC triggering and node capability check process shown in the step S1.00 of FIG. 3A and FIG. 3B. The flow shown in FIG. 5 is for exemplary purposes only, and thus other flows may also be used without departing from the scope of the present invention.

Referring to FIG. 4, when PBC triggering is achieved in step S110, a node 120 transmits to an AP 100 a probe request message (Probe Request) to configure a connection in step S120. In this case, the Probe Request includes a node capability Information Element (IE) indicating capability information of the node 120. In one exemplary embodiment, PBC triggering for the node 120 may be performed actively by a user.

If PBC triggering is achieved in step S130, the AP 100 transmits to the node 120 a probe response message (Probe Response) indicating capability information of the AP 100 in response to the Probe Request in step S140. In this case, the Probe Response includes a node capability IE. In one exemplary embodiment, PBC triggering for the AP 100 may be performed actively by the user.

In another exemplary embodiment, PBC triggering for the node 120 may be performed automatically in a predetermined beacon period.

In step S150, the node 120 checks the node capability of the AP 100 on the basis of the received Probe Response. If the AP 100 is checked as a node having a capability of configuring a connection, the node 120 transmits an authentication request message (Authentication Request) to the AP 100 in step S160.

Upon receiving the Authentication Request from the node 120, the AP 100 checks the node capability of the node 120 in step S170. If the node 120 is checked as the node having the capability of configuring the connection, the AP 100 transmits an authentication response message (Authentication Response) to the node 120 in response to the Authentication Request in step S180.

The node capability check scheme shown in FIG. 4 is used to strengthen connection security. For example, it is restricted such that only a device-type node which can join the same group can join a group. For another example, whether it is possible to join the same group may be determined according to whether to support a specific protocol or according to a security level, or the like. Node capability information is added to messages (e.g., Probe Request, Probe Response) exchanged to create a PBC connection, so as to report to an opposite party that the node can join the same group. A process of checking node capability information is performed before starting a PBC connection process. The node capability information is included in a message used for a PBC connection. For example, the message for the PBC connection may be the Probe Request/Response. The node capability information may be added to a vender specific IE of the Probe Request/Response.

Figure 5A:
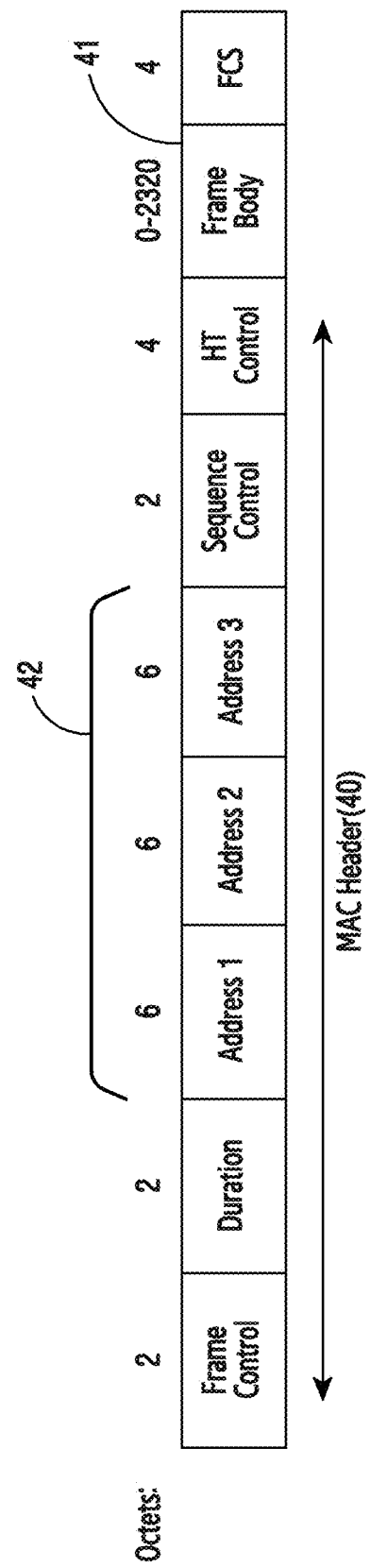
Figure 5C:
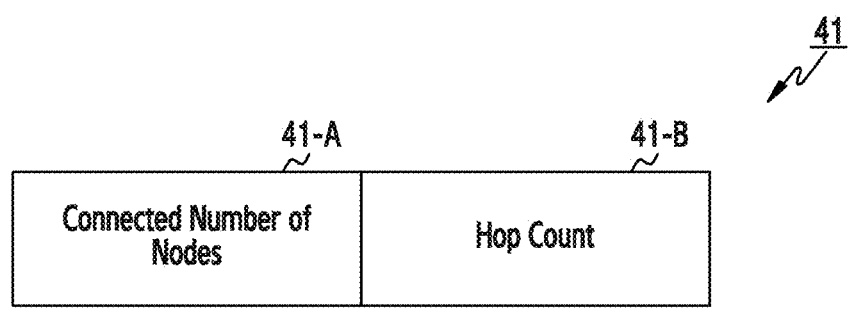

FIG. 5A to FIG. 5C illustrate a frame format of a connection configuration message for a connection configuration operation according to an exemplary embodiment of the present invention. For example, the Group Info. Request/Response, Probe Request/Response, and AP Info. Request/Response for the PBC connection may have a format as illustrated. The structures of FIG. 5A to FIG. 5C are for exemplary purposes only, and thus other structures may also be used without departing from the scope of the present invention.

Referring to FIG. 5A, the connection configuration message includes a MAC header 40 and a frame body 41. The MAC header 40 includes an address field 42.

Referring to FIG. 5B, the frame body 41 includes vendor specific information in a last order. Node capability information may be added to the vender specific information.

Referring to FIG. 5C, node capability information included in the frame body 41 includes a field 41-A including information on the number of currently connected nodes (i.e., connected number of nodes) and a field 41-B including information on the number of hops (i.e., hop count). The connected number of nodes implies the number of nodes connected to each of nodes in the group 10 of FIG. 1. In one exemplary embodiment, the hop count includes information indicating the number of hops from a center node. In another exemplary embodiment, the hop count includes information indicating the number of nodes from a source node. Herein, the source node implies a node which provides information such as music or the like among the nodes in the group 10 of FIG. 1. In one exemplary embodiment, node capability information may be included in a beacon or probe response message transmitted by each normal node and the center node 100 in the group 10. Although it is described herein that the node capability information includes the connected number of nodes and the hop count for example, the node capability information may include any one of them according to an implementation. The node capability information may have a size less than or equal to 1 byte.

Returning to FIG. 4, each node checks a node capability of a peer node in an authentication step. A node (e.g., the node 120) for transmitting an authentication request message (Authentication Request) checks a capability of the peer node before transmitting the Authentication Request, and transmits the Authentication Request only to a node capable of configuring a connection. Anode (e.g., the AP 100) for receiving the Authentication Request checks the capability of the peer node after receiving the Authentication Request, and transmits an authentication response message (Authentication Response) only to the node capable of configuring the connection. Although it is shown in FIG. 4 that the AP 100 and the node 120 perform a process of checking the capability of the peer node, it is also possible that the process of checking the capability of the peer node is performed between normal nodes (e.g., the node 120 and the node 170) as shown in FIG. 3B.

Figure 6:
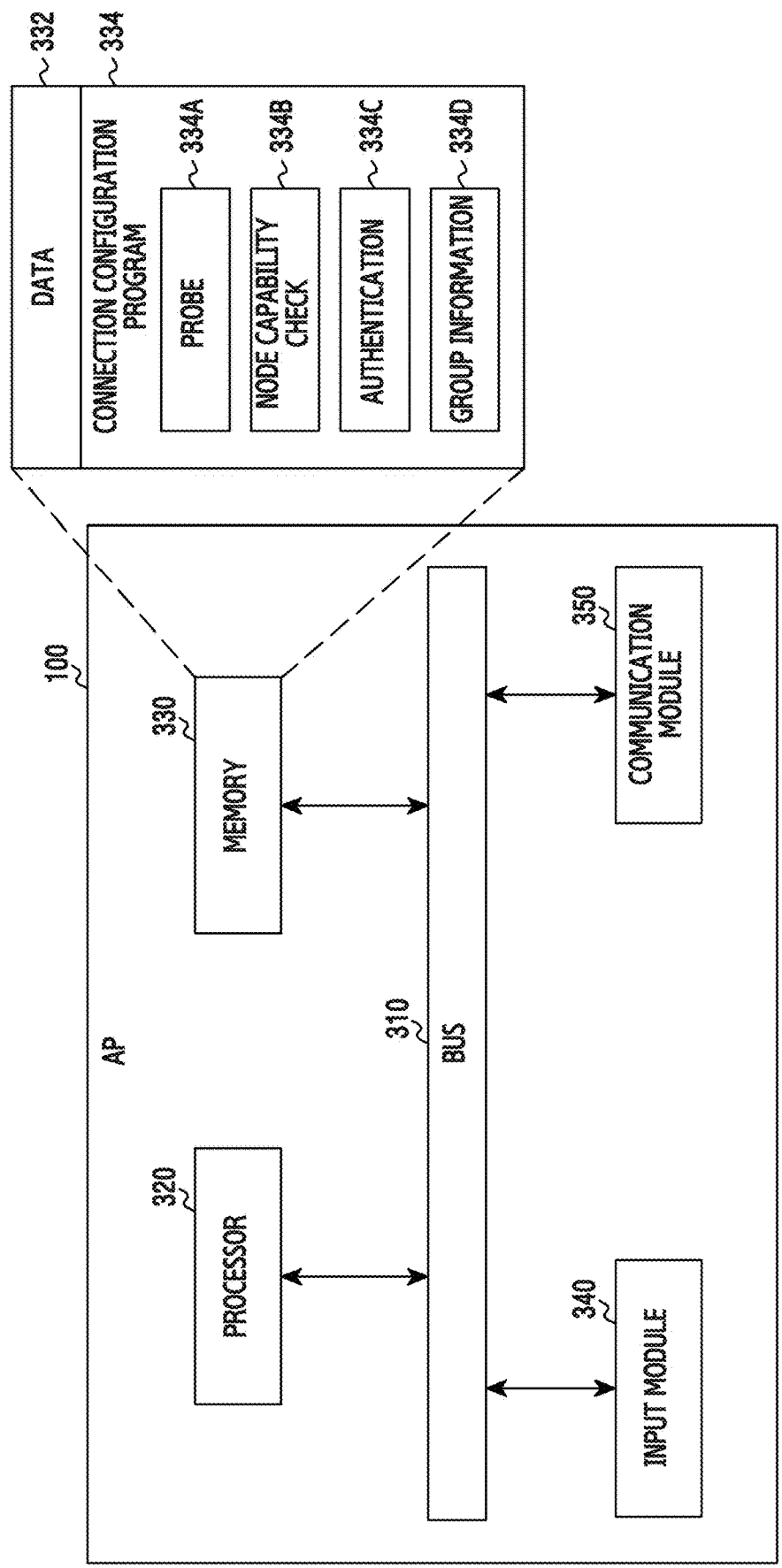
FIG. 6 illustrates a structure of a center node for a connection configuration operation according to an exemplary embodiment of the present invention.

FIG. 6 illustrates a structure of a center node for a connection configuration operation according to an exemplary embodiment of the present invention. It is shown herein for example that the AP 100 of FIG. 2A to FIG. 4 functions as the center node. The structure of FIG. 6 is for exemplary purposes only, and thus other structures may also be used without departing from the scope of the present invention.

Referring to FIG. 6, the AP 100 includes a bus 310, a processor 320, a memory 330, an input module 340, and a communication module 350. The bus 310 interconnects components included in the AP 100, and delivers communications between the components.

The processor 320 controls various functions related to the operation of the AP 100. For example, the processor 320 may interpret a command received from at least one different component included in the AP 100 via the bus 310, and may execute arithmetic operations or data processing according to the interpreted command.

The processor 320 executes one or more programs stored in the memory 330 to control a function for providing various services. For example, the processor 320 executes a connection configuration program 334 stored in the memory 330 to perform a connection configuration operation according to the exemplary embodiment of the present invention. Specifically, the processor 320 executes a probe processing program 334A to generate and transmit/receive a probe request/response message. The processor 320 executes a node capability check program 334B to check a capability of a peer node. The processor 320 executes an authentication processing program 334C to generate and transmit/receive an authentication request/response message. The processor 320 executes a group information processing program 334D to generate and transmit/receive a group information request/response message.

The memory 330 stores a command or data 332 received from at least one component included in the AP 100 or generated by at least one component. For example, the memory 330 stores a group list including information on nodes configured for a connection to the AP 100. Further, the memory 330 includes the connection configuration program 334. The connection configuration program 334 includes the probe processing program 334A, node capability check program 334B, authentication processing program 334C, and group information processing program 334D related to triggering for a connection configuration. The connection configuration program 334 may be configured in at least one of software, firmware, and hardware.

The input module 340 delivers a command or data generated by a user's selection or gesture to the processor 320 or the memory 330 via the bus 310. The input module 340 may include at least one of a physical key button, a physical key pad, a touch detection sensor, a proximity sensor, an acceleration sensor, a microphone, and a mouse.

The communication module 350 performs a communication connection between the AP 100 and at least one different node. For example, the communication module 350 may support a short distance communication protocol (e.g., Wi-Fi, BlueTooth (BT), Near Field Communication (NFC)). In addition, the communication module 350 may support network communication (e.g., Internet, Local Area Network (LAN), Wide Area Network (WAN), telecommunication network, cellular network, satellite network, Plain Old Telephone Service (POTS), or the like).

Figure 7:
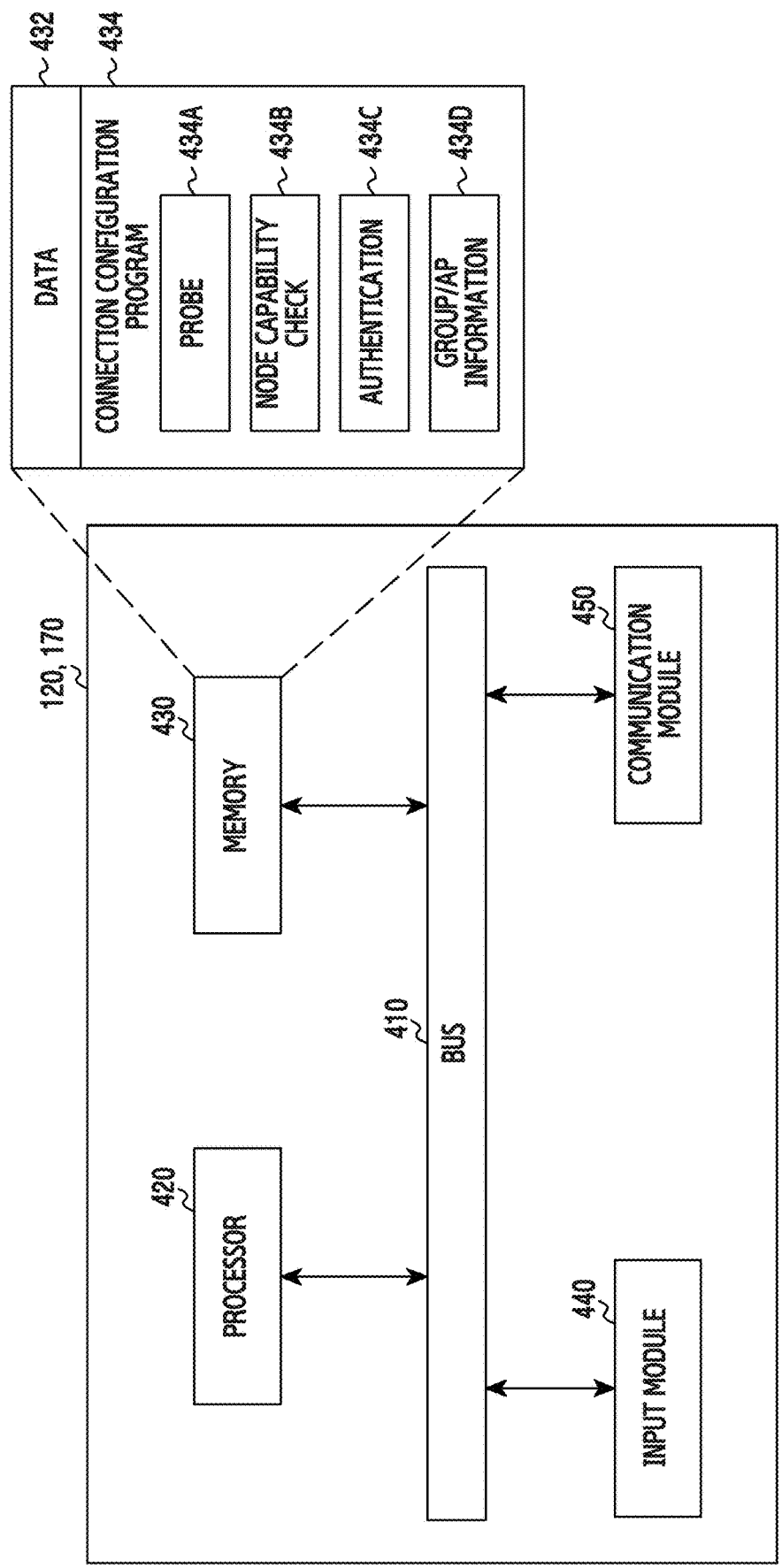
FIG. 7 illustrates a structure of a normal node for a connection configuration operation according to an exemplary embodiment of the present invention.

FIG. 7 illustrates a structure of a normal node for a connection configuration operation according to an exemplary embodiment of the present invention. Structures of the nodes 120 and 170 which respectively function as a relay node and a target node of FIG. 2A to FIG. 4 are shown herein for example. The structure of FIG. 7 is for exemplary purposes only, and thus other structures may also be used without departing from the scope of the present invention.

Referring to FIG. 7, the nodes 120 and 170 include a bus 410, a processor 420, a memory 430, an input module 140, and a communication module 450. The bus 410 interconnects components included in the nodes 120 and 170, and delivers communication between the components.

The processor 420 controls various functions related to the operation of the nodes 120 and 170. For example, the processor 420 may interpret a command received from at least one different component included in the nodes 120 and 170 via the bus 410, and may execute arithmetic operations or data processing according to the interpreted command.

The processor 420 executes one or more programs stored in the memory 430 to control a function for providing various services. For example, the processor 420 executes a connection configuration program 434 stored in the memory 430 to perform a connection configuration operation according to the exemplary embodiment of the present invention. Specifically, the processor 420 executes a probe processing program 434A to generate and transmit/receive a probe request/response message. The processor 420 executes a node capability check program 434B to check a capability of a peer node. The processor 420 executes an authentication processing program 434C to generate and transmit/receive an authentication request/response message. The processor 420 executes a group information processing program 434D to generate and transmit/receive a group information request/response message.

The memory 430 stores a command or data 432 received from at least one component included in the AP 100 or generated by at least one component. For example, the memory 430 receives from the AP a group list including information on nodes configured for a connection to the AP 100, and stores the group list. Further, the memory 430 includes the connection configuration program 434. The connection configuration program 434 includes the probe processing program 434A, node capability check program 434B, authentication processing program 434C, and group information processing program 434D related to triggering for a connection configuration. The connection configuration program 434 may be configured in at least one of software, firmware, and hardware.

The input module 440 delivers a command or data generated by a user's selection or gesture to the processor 420 or the memory 430 via the bus 410. The input module 440 may include at least one of a physical key button, a physical key pad, a touch detection sensor, a proximity sensor, an acceleration sensor, a microphone, and a mouse.

The communication module 450 performs a communication connection between the AP 100 and at least one different node. For example, the communication module 450 may support a short distance communication protocol (e.g., Wi-Fi, BT, NFC). In addition, the communication module 450 may support network communication (e.g., Internet, LAN, WAN, telecommunication network, cellular network, satellite network, POTS, or the like).

Figure 8:
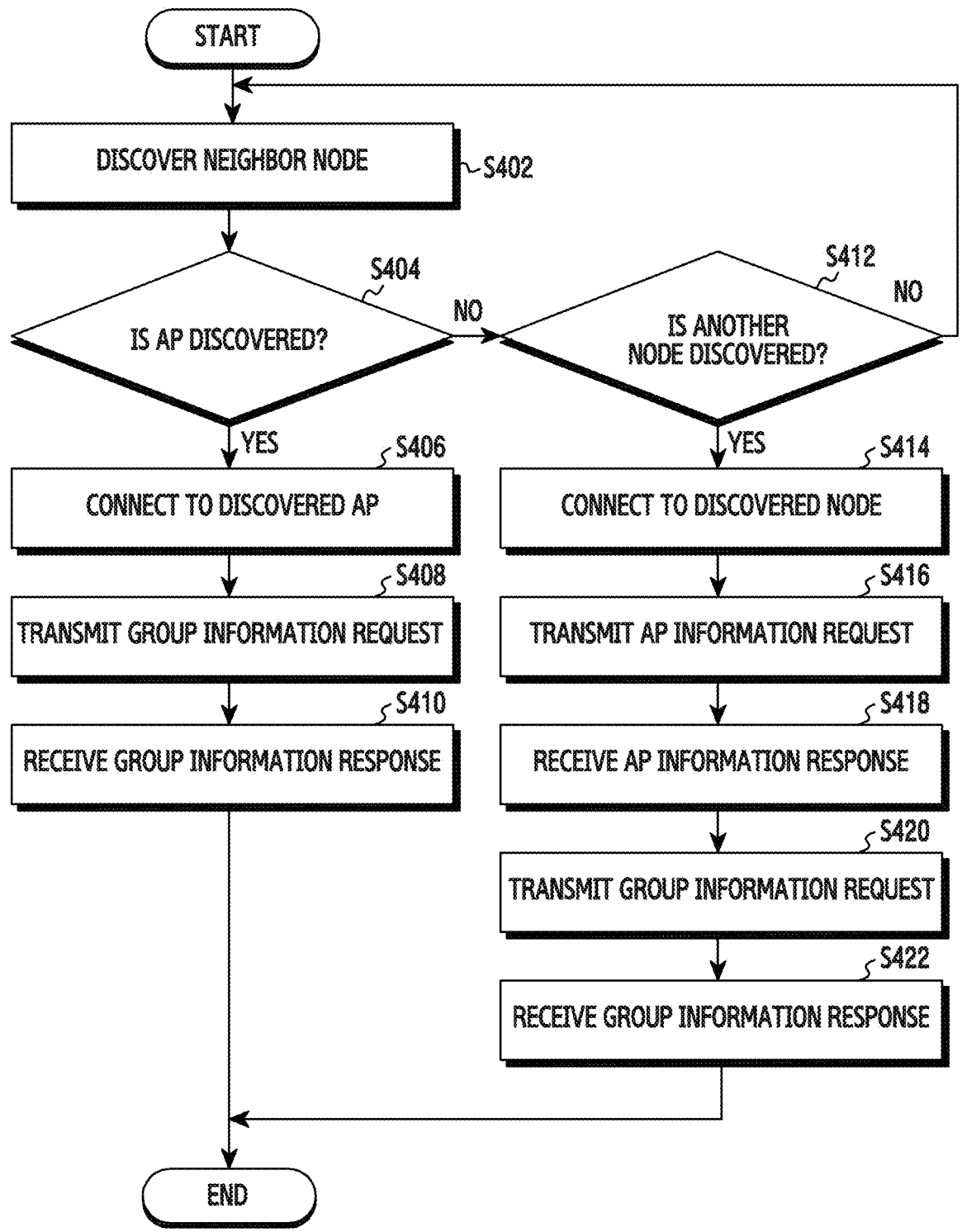
FIG. 8 illustrates a processing flow of a target node for a connection configuration operation according to an exemplary embodiment of the present invention.

FIG. 8 illustrates a processing flow of a target node for a connection configuration operation according to an exemplary embodiment of the present invention. For example, the target node may be the node 170 as the new enrollee shown in FIG. 2A to FIG. 4. The processing flow corresponds to the processing flow shown in FIG. 3B. The flow shown in FIG. 8 is for exemplary purposes only, and thus other flows may also be used without departing from the scope of the present invention.

Referring to FIG. 8, in step S402, the target node discovers a neighbor node located in a predetermined transmission area (e.g., 1-hop) from among nodes in the group 10 shown in FIG. 1. In one exemplary embodiment, if a center node, i.e., an AP, is discovered from among the nodes located in the transmission area, the target node selects the AP. In another exemplary embodiment, if the AP is not discovered from among the nodes located in the transmission area, the target node selects a node having the greatest received signal strength from among the nodes located in the transmission area. In another exemplary embodiment, if the AP is not discovered from among the nodes located in the transmission area, the target node selects any one node from among the nodes in the transmission area by considering the number of currently connected nodes and the number of hops from the center node. In another exemplary embodiment, if the AP is not discovered from among the nodes located in the transmission area, the target node selects any one node from among the nodes in the transmission area by considering the number of currently connected nodes and the number of hops from a source node.

In step S404, the target node checks whether the discovered neighbor node is the AP. If the discovered neighbor node is the AP, in step S406, the target node performs an operation of connecting to the discovered AP. For example, in step S406, the target node performs a PBC triggering and node capability check process with respect to the discovered AP 100 similarly to step S100 of FIG. 3B. In step S408, the target node transmits a group information request message to the AP 100. In step S410, the target node receives a group information response message from the AP 100.

If the discovered neighbor node is not the AP in step S404, in step S412, the target node checks whether a normal node enrolled to another group is discovered. If the discovered neighbor node is the normal node, in step S414, the target node performs an operation of connecting to the discovered normal node (or a relay node). For example, in step S414, the target node performs a PBC triggering and node capability check process with respect to the discovered node 120 similarly to step S300 of FIG. 3B. In step S416, the target node transmits an AP information request message to the relay node. In step S418, the target node receives an AP information response message from the relay node. In step S420, the target node transmits group information request message to the relay node. In step S422, the target node receives a group information response message from the relay node.

Figure 9:
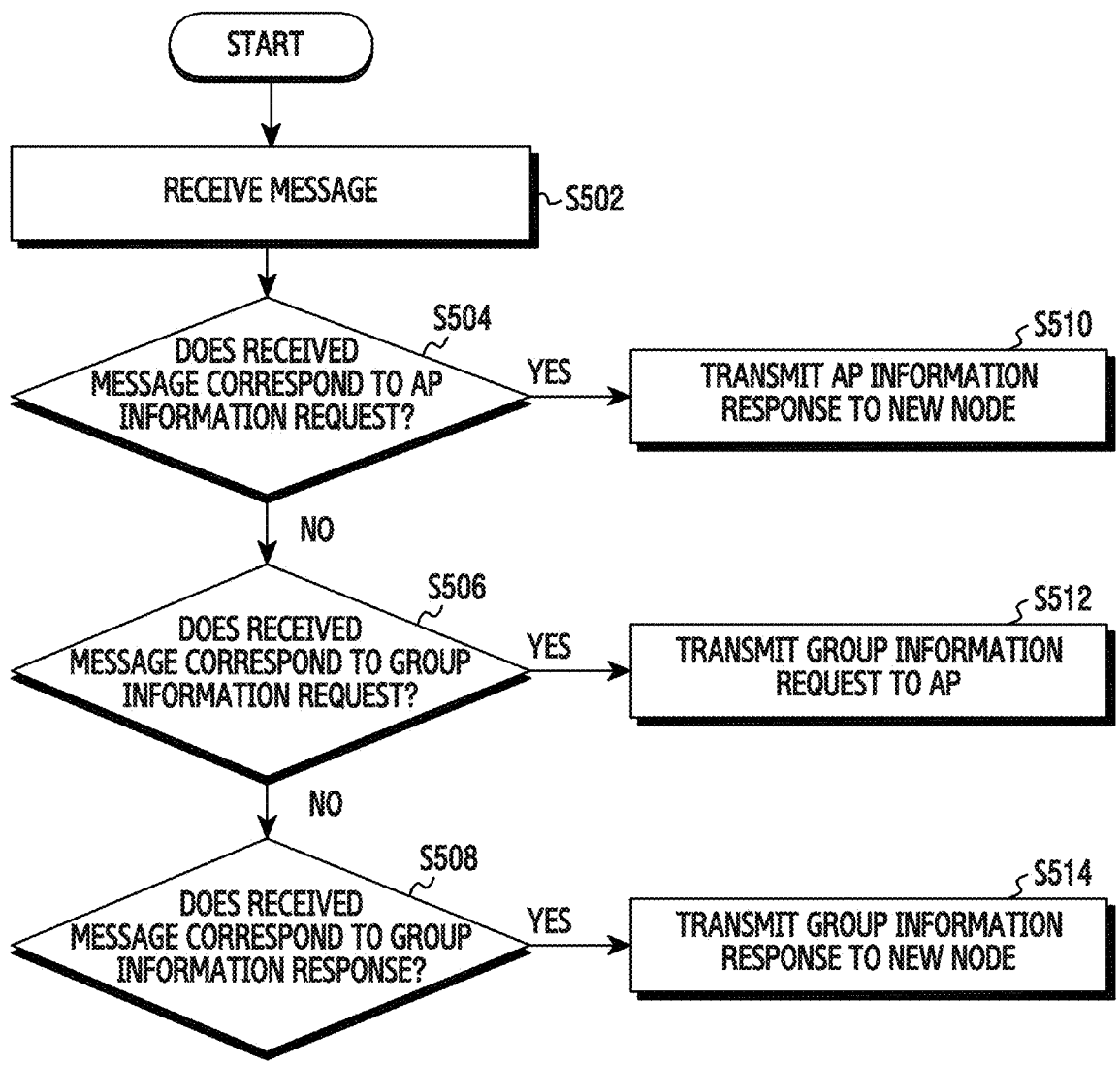
FIG. 9 illustrates a processing flow of a relay node for a connection configuration operation according to an exemplary embodiment of the present invention.

FIG. 9 illustrates a processing flow of a relay node for a connection configuration operation according to an exemplary embodiment of the present invention. For example, the relay node may be the node 120 shown in FIG. 2A to FIG. 4. The processing flow corresponds to the steps S310 to S360 shown in FIG. 3B. The flow shown in FIG. 9 is for exemplary purposes only, and thus other flows may also be used without departing from the scope of the present invention.

Referring to FIG. 9, the relay node receives a message in step S502. If it is checked in step S504 that the received message is an AP information request message, the relay node transmits an AP information response message to a target node as a new enrollee in step S510. If it is checked in step S506 that the received message is a group information request message, the relay node transmits the group information request message to a center node (or an AP) in step S512. If it is checked in step S508 that the received message is a group information response message, the relay node transmits the group information response message to the target node in step S514.

Figure 10:
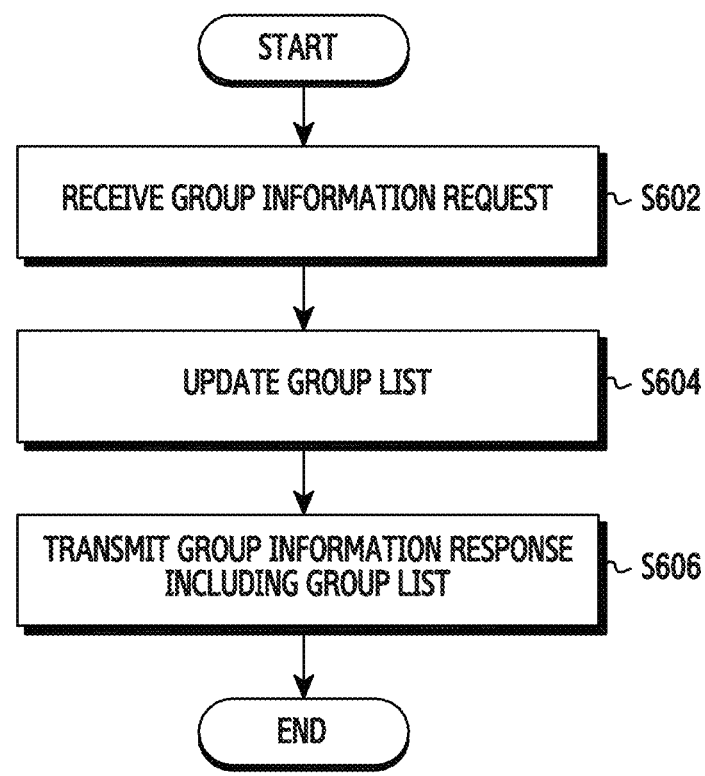
FIG. 10 illustrates a processing flow of a center node for a connection configuration operation according to an exemplary embodiment of the present invention.

FIG. 10 illustrates a processing flow of a center node for a connection configuration operation according to an exemplary embodiment of the present invention. For example, the center node may be the AP 100 shown in FIG. 2A to FIG. 4. The processing flow corresponds to the steps S210 and S220 or the steps S340 and S450 shown in FIG. 3B. The flow shown in FIG. 10 is for exemplary purposes only, and thus other flows may also be used without departing from the scope of the present invention.

Referring to FIG. 10, in step S602, the center node receives a group information request message from a relay node or a target node. Upon receiving the group information request message, in step S604, the center node updates a group list by adding IDentifier (ID) information of a transmitting-side node (or the target node) to the group list. In step S606, the center node transmits a group information response message including the updated group list to the relay node or the target node.

Figure 11:
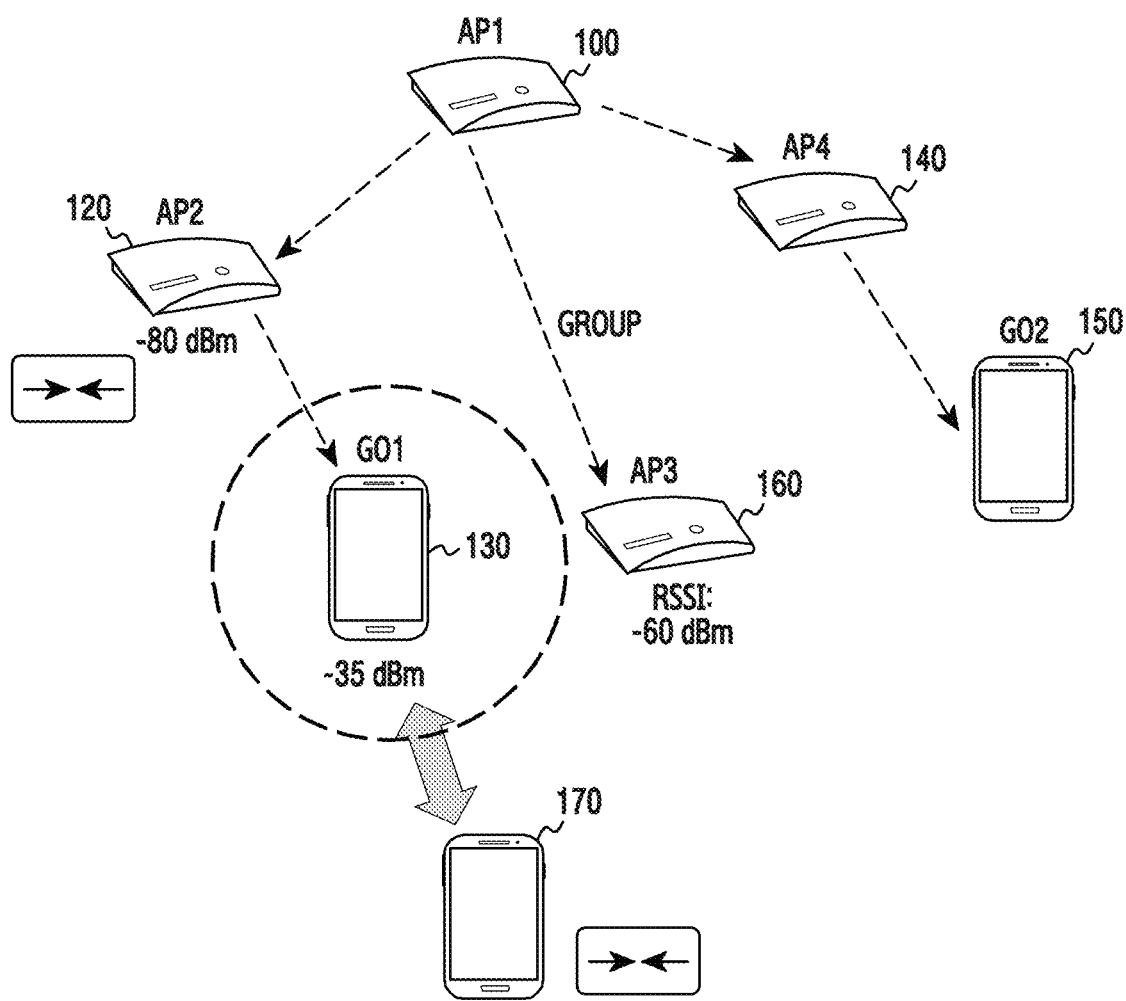
FIG. 11 illustrates an example of a connection configuration operation according to an exemplary embodiment of the present invention.

FIG. 11 illustrates an example of a connection configuration operation according to an exemplary embodiment of the present invention. This FIG. 30 corresponds to a wireless communication system having the structure as shown in FIG. 1. The structure shown in FIG. 11 is for exemplary purposes only, and thus other flows may also be used without departing from the scope of the present invention.

Referring to FIG. 11, a node 170 as a new enrollee discovers nodes located in a predetermined transmission area. If normal nodes 120, 130, and 160 are discovered, that is, if a probe response message is received from an AP2 120, a Group Owner (GO)1 130, and an AP3 160 to indicate that a connection is possible, the node 170 selects a node having the greatest received signal strength from among the discovered nodes. For example, if the received signal strength from the AP2 120 is −80 dBm, the received signal strength from the GO1 130 is −35 dBm, and the received signal strength from the AP3 160 is −60 dBm, then the node 170 selects the G01 which is a node having the greatest received signal strength, and thus is connected to the selected node, i.e., the G01 130.

Figure 12:
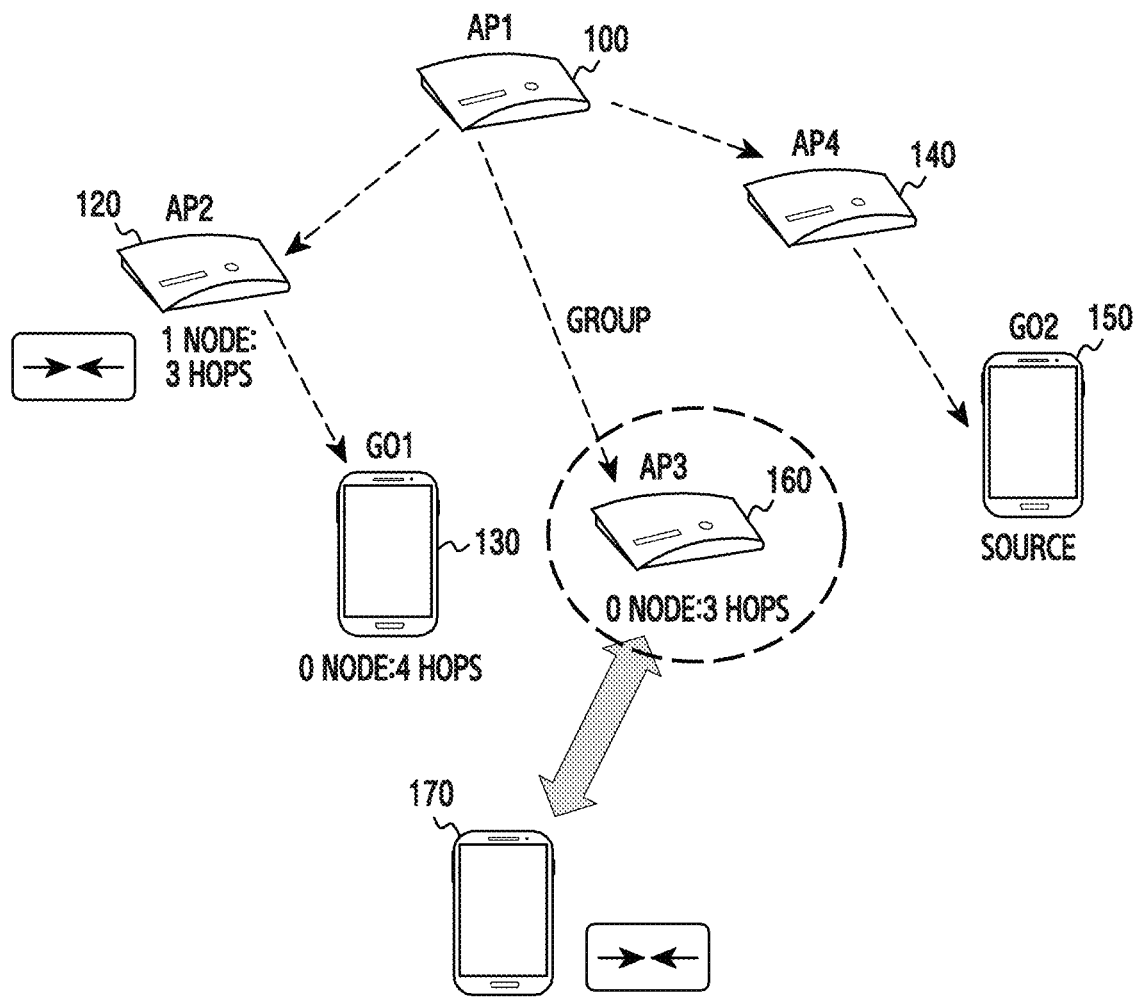
FIG. 12 illustrates another example of a connection configuration operation according to an exemplary embodiment of the present invention.

FIG. 12 illustrates another example of a connection configuration operation according to an exemplary embodiment of the present invention. This figure corresponds to a wireless communication system having the structure as shown in FIG. 1. The structure shown in FIG. 12 is for exemplary purposes only, and thus other flows may also be used without departing from the scope of the present invention.

Referring to FIG. 12, a node 170 as a new enrollee discovers nodes located in a predetermined transmission area. If normal nodes 120, 130, and 160 are discovered, that is, if a probe response message is received from an AP2 120, a GO1 130, and an AP3 160 to indicate that a connection is possible, the node 170 selects a node having the smallest number of connected nodes and the smallest number of hops from a source node from among the discovered nodes by considering the number of the connected nodes and the number of hops from the source node. For example, if the number of nodes connected to the AP2 120 is 1, the number of hops from the source node 150 to the AP1 120 is 3, the number of hops from the source node 150 to the GO1 130 is 4, the number of nodes connected to the AP3 130 is 0, and the number of hops from the source node 150 to the AP3 130 is 3, then the node 170 selects the AP3 160 having the smallest number of connected nodes and the smallest number of hops from the source node 150, and thus is connected to the selected node, i.e., the AP3 160.

The reason of selecting the node having the smallest number of connected nodes and the smallest number of hops from the source node from among the discovered nodes is to configure a network having optimal performance even if a service area is extended with a multi-hop network topology as shown in FIG. 1. According to the exemplary embodiment of the present invention, network traffic can be simplified also in a situation where a plurality of wireless devices simultaneously transmit data and forward data in a multi-hop manner in a WLAN system.

It is described above with reference to FIG. 12 that the node 170 selects the node having the smallest number of connected nodes and the smallest number of hops from the source node 150 from among the discovered nodes by considering the number of connected nodes and the number of hops from the source node 150. In another exemplary embodiment, the node 170 may select the node having the smallest number of connected nodes and the smallest number of hops from the center node 100 from among the discovered nodes by considering the number of connected nodes and the number of hops from the center node 100.

Figure 13:
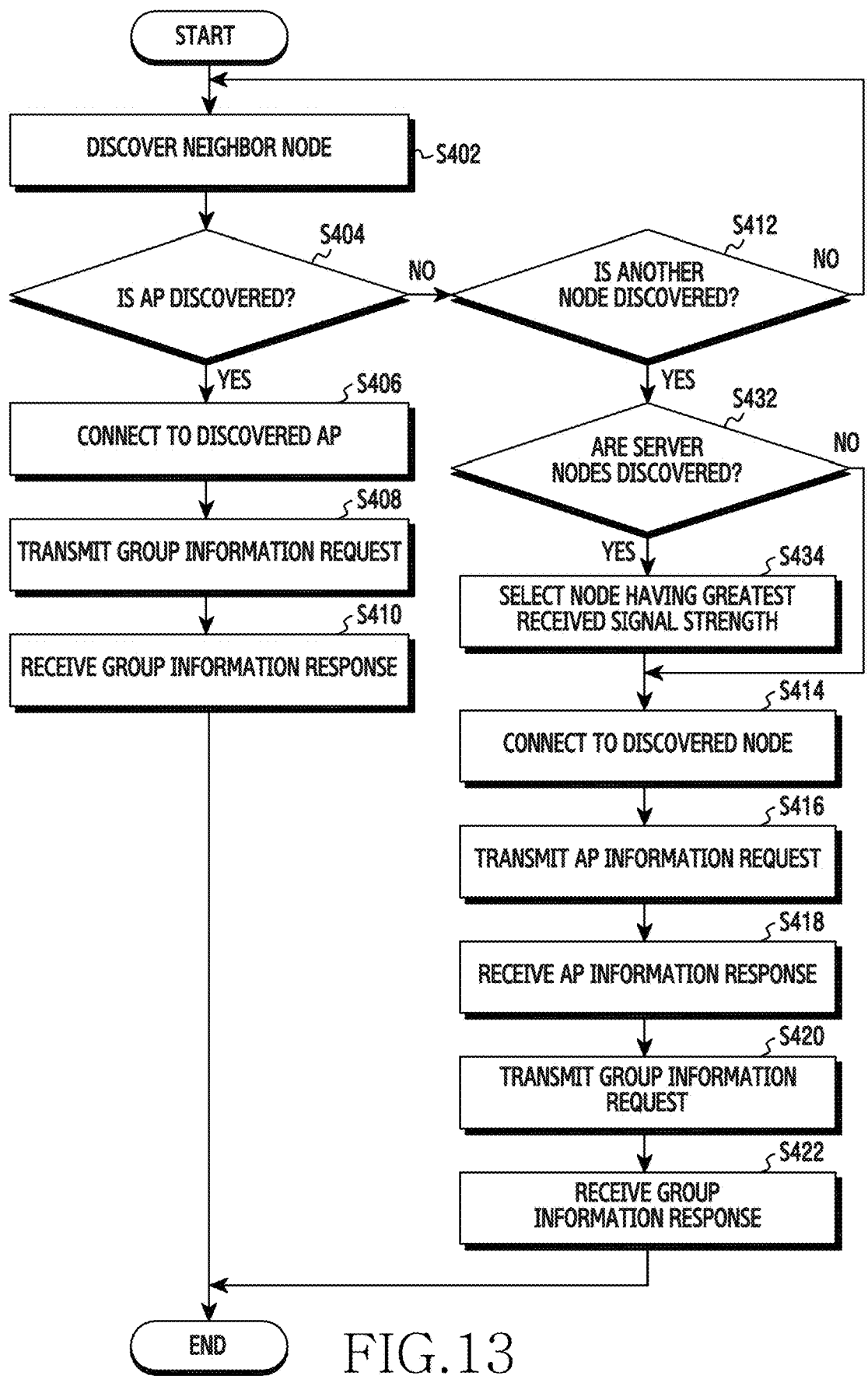
FIG. 13 illustrates an example of a processing flow of a target node for a connection configuration operation according to an exemplary embodiment of the present invention.

FIG. 13 illustrates an example of a processing flow of a target node for a connection configuration operation according to an exemplary embodiment of the present invention. This example corresponds to an example in which the target node selects any one node from among discovered nodes on the basis of received signal strength, upon discovering a plurality of normal nodes in a group. Herein, the illustrated processing flow corresponds to the example shown in FIG. 11. The flow shown in FIG. 13 is for exemplary purposes only, and thus other flows may also be used without departing from the scope of the present invention.

Referring to FIG. 13, in step S402, the target node discovers a neighbor node located in a predetermined transmission area (e.g., 1-hop) from among nodes in the group 10 shown in FIG. 1.

In step S404, the target node checks whether the discovered neighbor node is the AP. If the discovered neighbor node is the AP, in step S406, the target node performs an operation of connecting to the discovered AP. For example, in step S406, the target node performs a PBC triggering and node capability check process with respect to the discovered AP 100 similarly to step S100 of FIG. 3B. In step S408, the target node transmits a group information request message to the AP 100. In step S410, the target node receives a group information response message from the AP 100.

If the discovered neighbor node is not the AP in step S404, in step S412, the target node checks whether a normal node enrolled to another group is discovered. If the discovered neighbor node is the normal node, in step S432, the target node checks whether several nodes are discovered. If the several nodes are discovered, the target node performs an operation of step S434, and then proceeds to step S414. On the other hand, if the several nodes are not discovered, that is, if one node is discovered, the target node proceeds to step S414.

In step S434, the target node selects a node having the greatest received signal strength from among the discovered several nodes.

In step S414, the target node performs an operation of connecting to a discovered normal node (or a relay node). For example, in step S414, the target node performs a PBC triggering and node capability check process with respect to the discovered node 120 similarly to step S300 of FIG. 3B. In step S416, the target node transmits an AP information request message to the relay node. In step S418, the target node receives an AP information response message from the relay node. In step S420, the target node transmits group information request message to the relay node. In step S422, the target node receives a group information response message from the relay node.

Figure 14:
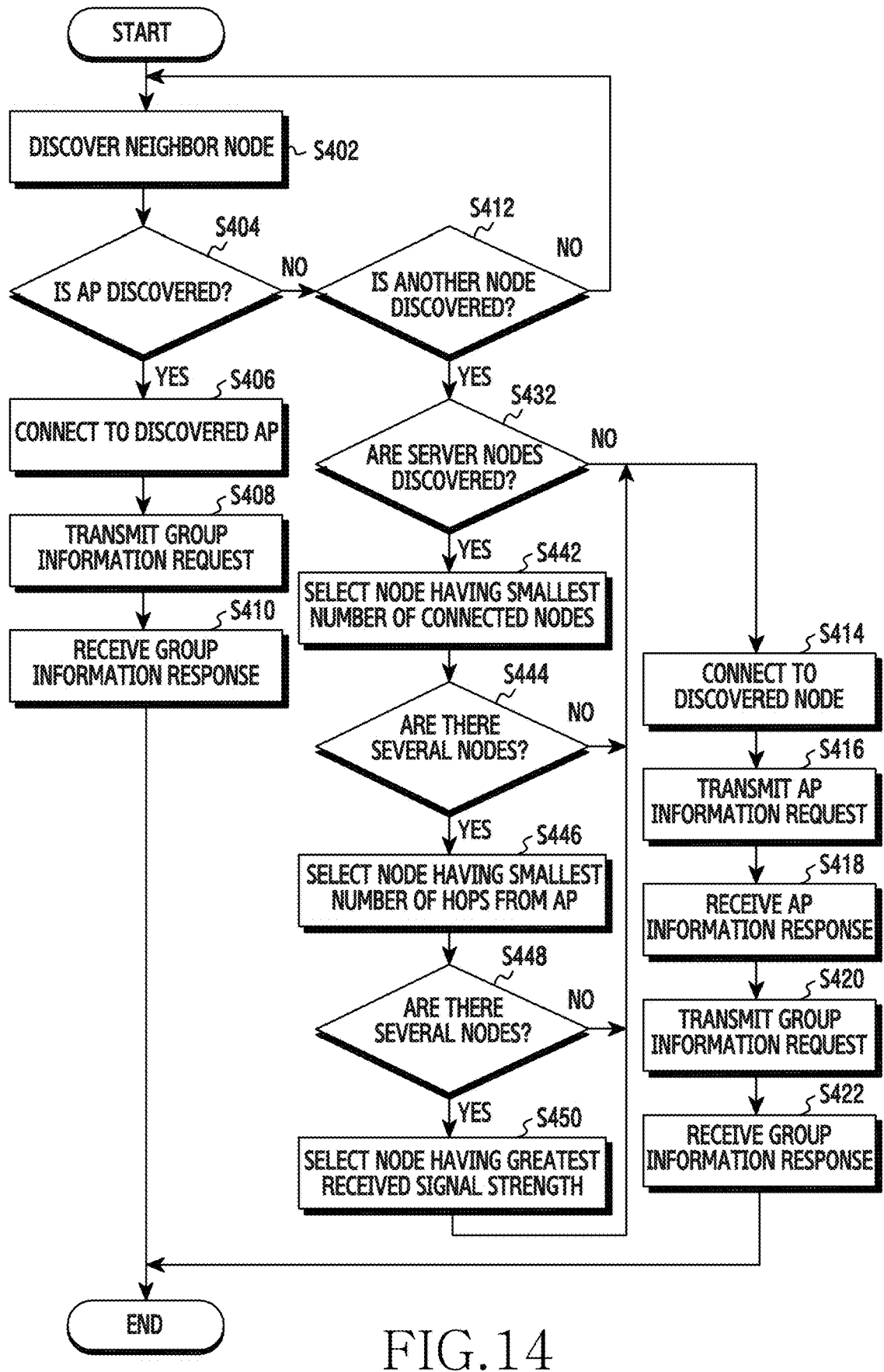
FIG. 14 illustrates another example of a processing flow of a target node for a connection configuration operation according to an exemplary embodiment of the present invention.

FIG. 14 illustrates another example of a processing flow of a target node for a connection configuration operation according to an exemplary embodiment of the present invention. This example corresponds to an example in which the target node selects any one node from among discovered nodes on the basis of the number of connected node and the number of hops from an AP which is a center node, upon discovering a plurality of normal nodes in a group. The flow shown in FIG. 14 is for exemplary purposes only, and thus other flows may also be used without departing from the scope of the present invention.

Referring to FIG. 14, in step S402, the target node discovers a neighbor node located in a predetermined transmission area (e.g., 1-hop) from among nodes in the group 10 shown in FIG. 1.

In step S404, the target node checks whether the discovered neighbor node is the AP. If the discovered neighbor node is the AP, in step S406, the target node performs an operation of connecting to the discovered AP. For example, in step S406, the target node performs a PBC triggering and node capability check process with respect to the discovered AP 100 similarly to step S100 of FIG. 3B. In step S408, the target node transmits a group information request message to the AP 100. In step S410, the target node receives a group information response message from the AP 100.

If the discovered neighbor node is not the AP in step S404, in step S412, the target node checks whether a normal node enrolled to another group is discovered. If the discovered neighbor node is the normal node, in step S432, the target node checks whether several nodes are discovered. If the several nodes are discovered, the target node proceeds to step S442. On the other hand, if the several nodes are not discovered, that is, if one node is discovered, the target node proceeds to step S414.

In step S442, the target node selects a node having the smallest number of connected nodes from among the discovered several nodes. In step S444, the target node checks whether there are several nodes having the smallest number of connected nodes. If there are several nodes having the smallest number of connected nodes, in step S446, the target node selects a node having the smallest number of hops from the center node, i.e., the AP. On the other hand, if there are not several nodes having the smallest number of nodes, that is, if there is one node, the target node proceeds to step S414.

In step S448, the target node checks whether there are several nodes having the smallest number of hops from the AP. If there are several nodes having the smallest number of hops from the AP, in step S450, the target node selects a node having the greatest received signal strength, and then proceeds to step S414. On the other hand, if there are not several nodes having the smallest number of hops, that is, if there is one node, the target node proceeds to step S414.

In step S414, the target node performs an operation of connecting to a discovered normal node (or a relay node). For example, in step S414, the target node performs a PBC triggering and node capability check process with respect to the discovered node 120 similarly to step S300 of FIG. 3B. In step S416, the target node transmits an AP information request message to the relay node. In step S418, the target node receives an AP information response message from the relay node. In step S420, the target node transmits group information request message to the relay node. In step S422, the target node receives a group information response message from the relay node.

Figure 15:
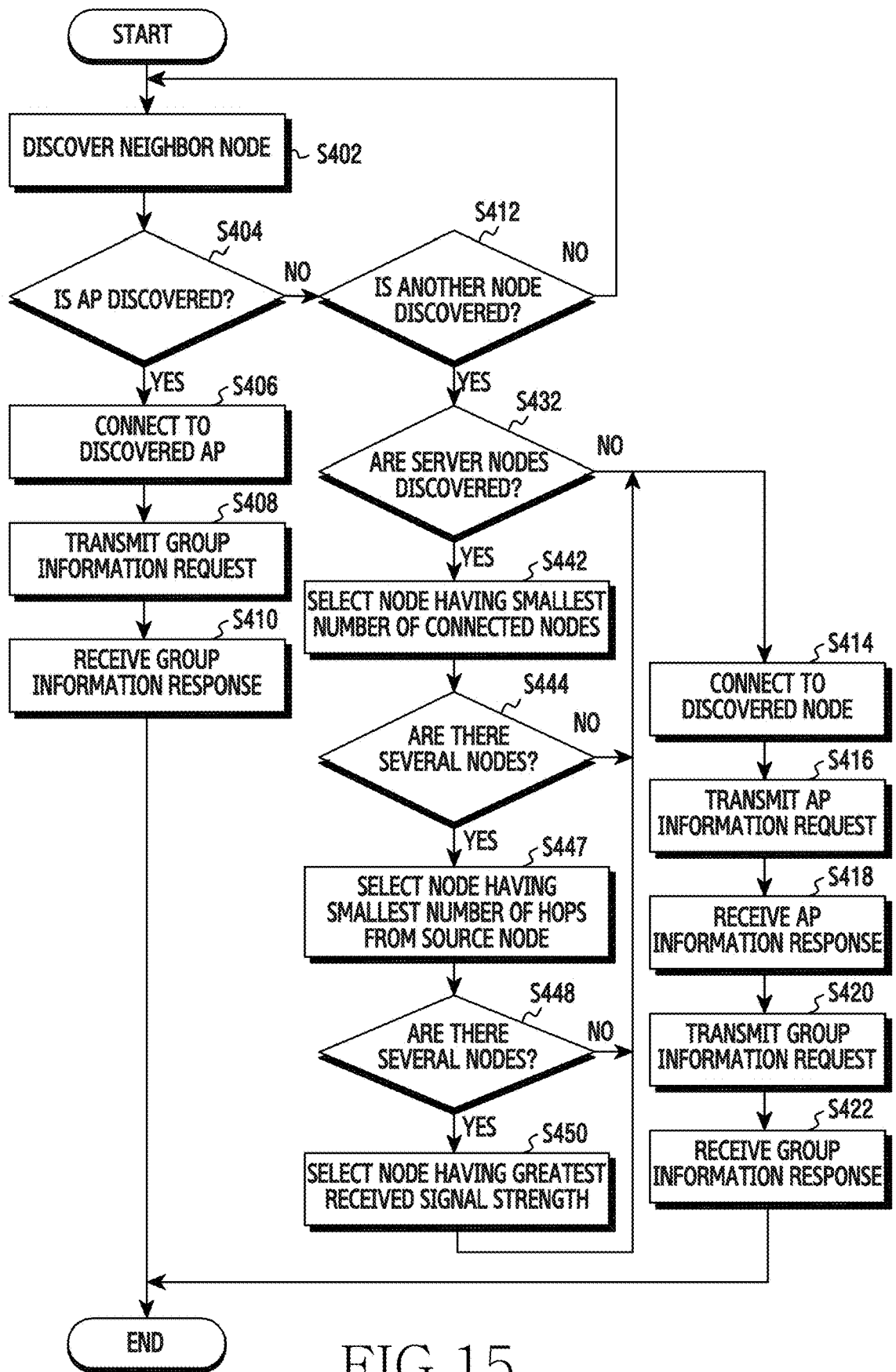
FIG. 15 illustrates another example of a processing flow of a target node for a connection configuration operation according to an exemplary embodiment of the present invention.

FIG. 15 illustrates another example of a processing flow of a target node for a connection configuration operation according to an exemplary embodiment of the present invention. This example corresponds to an example in which the target node selects any one node from among discovered nodes on the basis of the number of connected node and the number of hops from a source node, upon discovering a plurality of normal nodes in a group. Herein, the illustrated processing flow corresponds to the example shown in FIG. 12. Referring to FIG. 15, in step S402, the target node discovers a neighbor node located in a predetermined transmission area (e.g., 1-hop) from among nodes in the group 10 shown in FIG. 1. The flow shown in FIG. 15 is for exemplary purposes only, and thus other flows may also be used without departing from the scope of the present invention.

In step S404, the target node checks whether the discovered neighbor node is the AP. If the discovered neighbor node is the AP, in step S406, the target node performs an operation of connecting to the discovered AP. For example, in step S406, the target node performs a PBC triggering and node capability check process with respect to the discovered AP 100 similarly to step S100 of FIG. 3B. In step S408, the target node transmits a group information request message to the AP 100. In step S410, the target node receives a group information response message from the AP 100.

If the discovered neighbor node is not the AP in step S404, in step S412, the target node checks whether a normal node enrolled to another group is discovered. If the discovered neighbor node is the normal node, in step S432, the target node checks whether several nodes are discovered. If the several nodes are discovered, the target node proceeds to step S442. On the other hand, if the several nodes are not discovered, that is, if one node is discovered, the target node proceeds to step S414.

In step S442, the target node selects a node having the smallest number of connected nodes from among the discovered several nodes. In step S444, the target node checks whether there are several nodes having the smallest number of connected nodes. If there are several nodes having the smallest number of connected nodes, in step S447, the target node selects a node having the smallest number of hops from the source node. On the other hand, if there are not several nodes having the smallest number of nodes, that is, if there is one node, the target node proceeds to step S414.

In step S448, the target node checks whether there are several nodes having the smallest number of hops from the source node. If there are several nodes having the smallest number of hops from the source node, in step S450, the target node selects a node having the greatest received signal strength, and then proceeds to step S414. On the other hand, if there are not several nodes having the smallest number of hops, that is, if there is one node, the target node proceeds to step S414.

In step S414, the target node performs an operation of connecting to a discovered normal node (or a relay node). For example, in step S414, the target node performs a PBC triggering and node capability check process with respect to the discovered node 120 similarly to step S300 of FIG. 3B. In step S416, the target node transmits an AP information request message to the relay node. In step S418, the target node receives an AP information response message from the relay node. In step S420, the target node transmits group information request message to the relay node. In step S422, the target node receives a group information response message from the relay node.

According to the aforementioned exemplary embodiments of the present invention, the target node selects and connects a node in a group to be connected, and transmits/receives group information. When the target node discovers a neighbor node upon discovering an AP corresponding to a center node, the target node unconditionally attempts a connection to the AP. This is because, since the center node has a 1-hop relation corresponding to a minimum hop even if received signal strength is weaker than that of normal nodes in another group, it is preferable to decrease a total traffic generation amount by minimizing the total number of hops in a multi-hop network.

Further, according to the exemplary embodiments of the present invention, in order to provide a reliable service, each target node connects to a node having the smallest number of WLAN devices supporting a connection, instead of connecting to a node corresponding to an optimal path. In addition, according to the exemplary embodiments of the present invention, it may connect to a node having the smallest number of hops from a center node or a source node.

The exemplary embodiment shown in FIG. 14 illustrates an operation process considering the number of currently connected nodes and the number of hops from the center node when selecting one node from among discovered several normal nodes. Received signal strength is a measurement parameter between two nodes and is in proportion to a distance. On the other hand, the number of nodes currently connected to each normal node and the number of hops from the center node are parameters capable of estimating a total traffic amount on a network and a capability of supporting a service of an upper node to which a corresponding node is connected, in case of a multi-hop topology. Therefore, in case of selecting a node to be connected in a Wi-Fi wireless communication scheme, so called a CSMA/CA scheme, when determining whether a reliable service is supported and whether service quality to be provided by a WLAN device is satisfied, the number of connected nodes and the number of hops from the center node may be more useful values.

There is a need to consider the number of currently connected nodes irrespective of which node in a group is used as a source node for a service or to which node in the group a connection will be achieved. On the other hand, although the number of hops is optimal when the connection is achieved with the smallest number of hops from the source node, an additional overhead occurs in order to change a topology dynamically in every service. Therefore, the exemplary embodiments of the present invention basically propose the method (see FIG. 14) for providing information on the number of hops from the AP, and also propose the method (see FIG. 15) for providing information on the number of hops from the source node by considering a situation of changing a function of dynamically changing a multi-hop topology.

Figure 16:
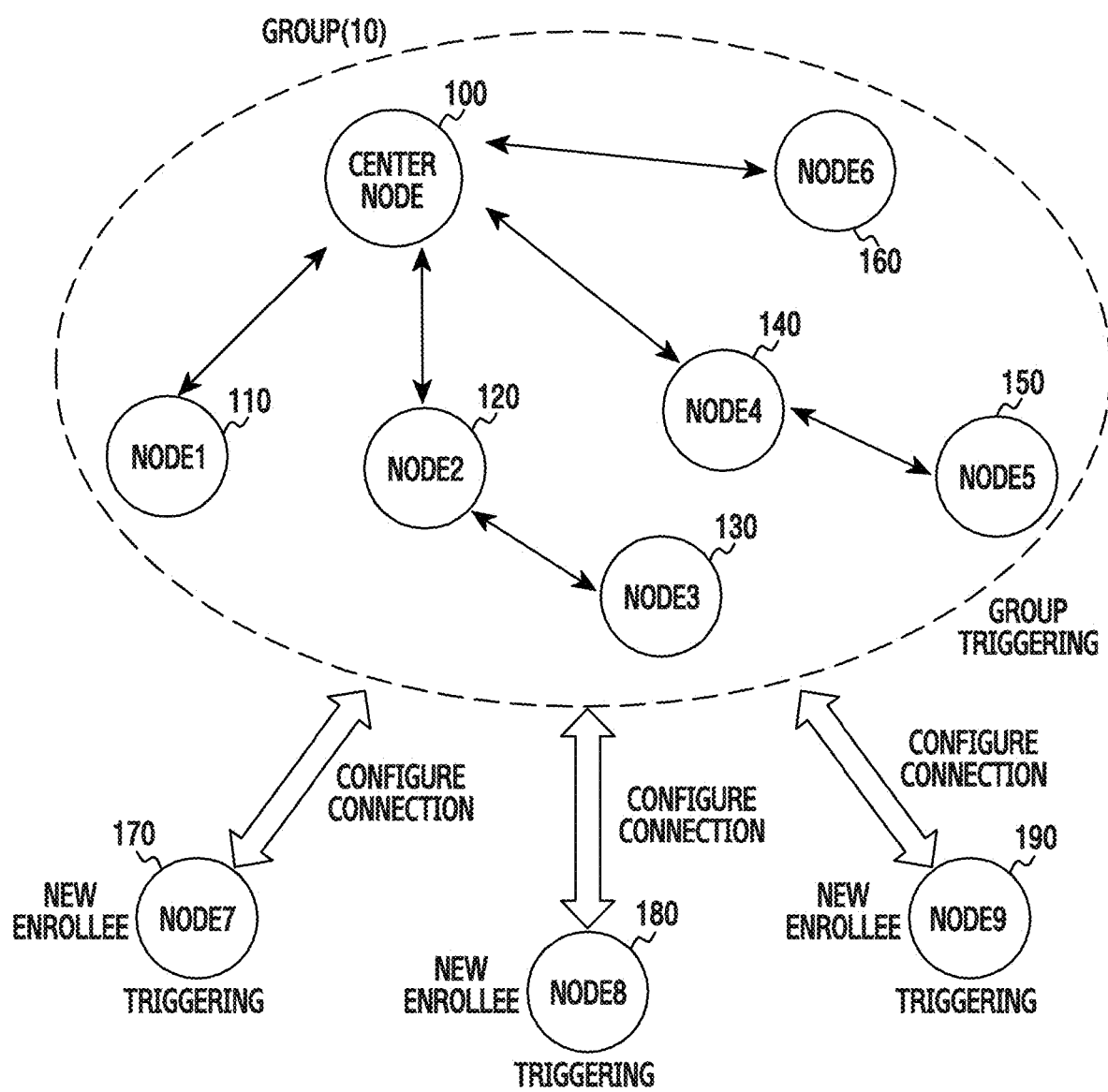
FIG. 16 illustrates a structure of a wireless communication system according to another exemplary embodiment of the present invention.

FIG. 16 illustrates a structure of a wireless communication system according to another exemplary embodiment of the present invention. The structure of FIG. 16 is for exemplary purposes only, and thus other structures may also be used without departing from the scope of the present invention.

Referring to FIG. 16, the wireless communication system includes a network group 10 constructed of a center node 100 and nodes 110 to 160 located in specific areas and includes a node7 170, a node8 180, and a node9 190 as new enrollees which attempt to configure a connection to the network group 10.

The nodes 110 to 160 have already been configured for a connection to the center node 100 to form a network group 10. The node1 110 is configured for a connection directly to the center node 100. The node2 120 is configured for a connection directly to the center node 100. The node4 140 is configured for a connection directly to the center node 100. The node6 160 is configured for a connection directly to the center node 100. The node3 130 is configured for a connection to the center node 100 via the node2 120. The node5 is configured for a connection to the center node 100 via the node4 140.

As the new enrollees, the node7 170, the node8 180, and the node9 190 are configured for a connection to the network group 10 by using a multiple-triggering scheme. The multiple-triggering scheme is a scheme in which a plurality of nodes must be triggered within a predetermined walk time in order to be configured for a connection. During a connection configuration is achieved for one node, pending or retrial is achieved in another node.

The multiple-triggering scheme may be used when a user configures a connection to the plurality of devices (or nodes). For example, if the user is pending after triggering the three target nodes 170, 180, and 190 as the new enrollees, the target nodes 170, 180, and 190 are automatically configured for a connection. The multiple-triggering scheme includes the exemplary embodiments shown in FIG. 12 and FIG. 13. Although the user performs PBC triggering for a connection configuration in FIG. 12 and FIG. 13, this is for exemplary purposes only, and thus the scope of the present invention is not limited thereto.

Figure 17:
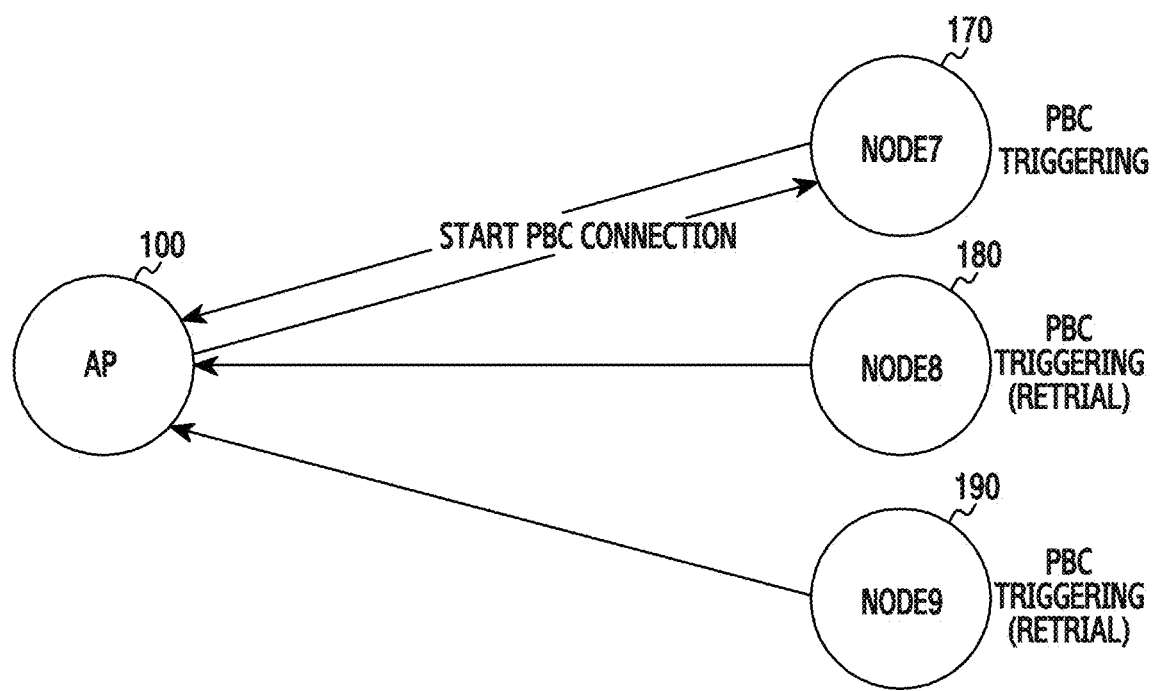
FIG. 17 is a view for explaining an example of a connection configuration operation according to another exemplary embodiment of the present invention.

FIG. 17 is a view for explaining an example of a connection configuration operation according to another exemplary embodiment of the present invention. This exemplary embodiment corresponds to a scheme in which when any one node is configured for a connection through multi-triggering, other nodes are retrying.

Referring to FIG. 17, a plurality of target nodes 170, 180, and 190 as new enrollees are concurrently PBC-triggered by a user. An AP 100 receives a PBC connection request from the plurality of nodes 170, 180, and 190. The AP 100 proceeds to the PBC connection by selecting one (e.g., the node 170) of the nodes 170, 180, and 190 which request for the connection. After transmitting the PBC connection request, the nodes 180 and 190 retransmit the PBC connection request if a PBC connection proceeding message (e.g., AP Info. Response or Group Info. Response) is not received from the AP 100 during a specific time period. For example, a PBC connection retransmission count may be predetermined, and each target node retries the PBC connection until a maximum count.

Figure 18:
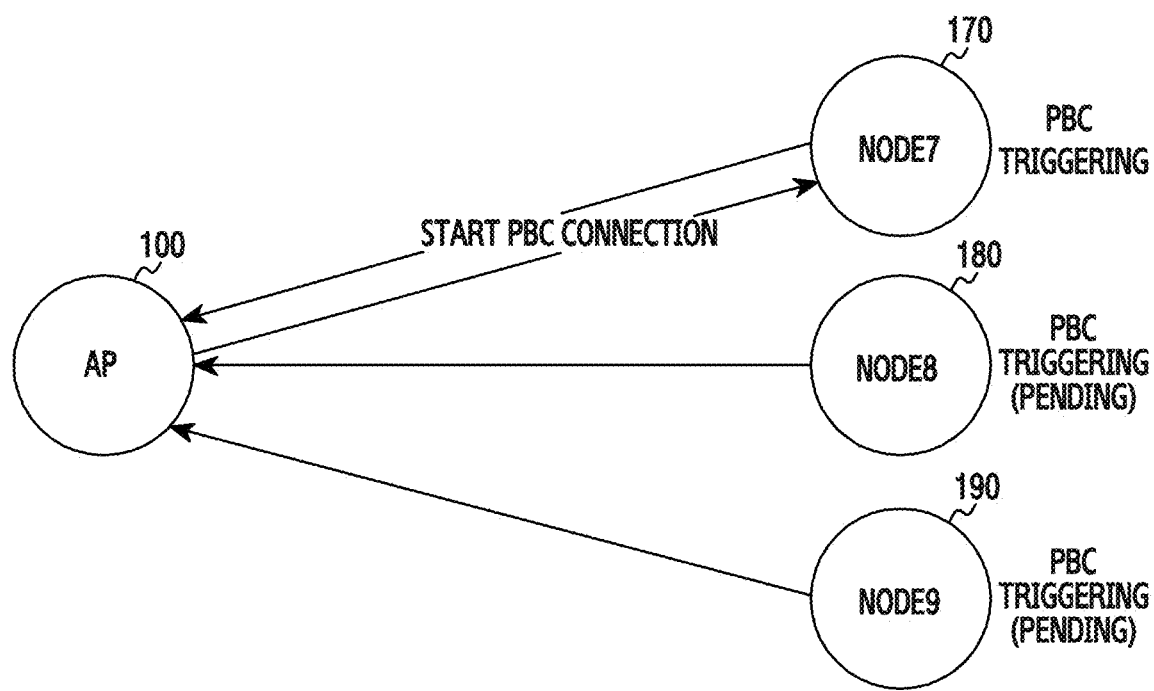
FIG. 18 is a view for explaining another example of a connection configuration operation according to another exemplary embodiment of the present invention.

FIG. 18 is a view for explaining another example of a connection configuration operation according to another exemplary embodiment of the present invention. This exemplary embodiment corresponds to a scheme in which when any one node is configured for a connection through multi-triggering, other nodes are pending.

Referring to FIG. 18, a plurality of target nodes 170, 180, and 190 as new enrollees are concurrently PBC-triggered by a user. An AP 100 receives a PBC connection request from the plurality of nodes 170, 180, and 190. The AP 100 proceeds to the PBC connection by selecting one (e.g., the node 170) of the nodes 170, 180, and 190 which request for the connection. In this case, the AP 100 stores the PBC connection request of the remaining nodes (e.g., the nodes 180 and 190). After one PBC connection is complete, the AP 100 proceeds to the PBC connection by selecting one of the stored PBC connection requests. After transmitting the PBC connection request, the nodes 180 and 190 are pending until a PBC connection proceeding message (e.g., AP Info. Response or Group Info. Response) is received from the AP 100.

Returning to FIG. 6, in a wireless communication system including a group formed by at least one center node 100, the center node 100 includes: the communication module 350 for receiving a request for a connection to the group by two or more target nodes within a predetermined time; and the processor 320 for sequentially configuring a connection of the target nodes to the group.

In one exemplary embodiment, the processor 320 selects a first node from among the target nodes to configure a connection of the first node to the group, and thereafter selects a second node other than the first node to configure a connection of the second node to the group. For example, the processor 320 selects the second node in response to receiving of a signal corresponding to a connection configuration request by the second node.

In one exemplary embodiment, the processor 320 stores information on the target nodes, and selects the first node from among the target nodes to configure a connection of the first node to the group. After configuring a connection of the first node to the group, the processor 320 selects the second node other than the first node from among the target nodes from information on the target nodes, and configures the connection of the second node to the group.

In one exemplary embodiment, when selecting any one target node from among the target nodes and configuring a connection of the selected target node to the group, the processor 320 selects any one target node from among the target nodes, and updates node information indicating a node configured for a connection to a group by adding the selected target node to the group in response to receiving of a group information request signal via the communication module 350. The communication module 350 transmits a group information response signal including the updated node information.

In one exemplary embodiment, if the selected target node is a target node which can join the group, the processor 320 configures a connection of the selected target node to the group. For example, checking of whether the selected target node is the target node which can join the group may be performed by a center node for triggering a connection request by a user or a normal node which has joined the group.

In one exemplary embodiment, the communication module 350 further performs an operation of providing the target nodes with at least one of information on the number of connected nodes and information on the number of hops from the center node or the source node in the group, for each node included in the group.

Returning to FIG. 7, in a wireless communication system including a group formed by at least one node, the target node 170 for requesting a connection to a group within a predetermined time includes the communication module 450 and the processor 420 for discovering at least one node of the group located in a predetermined transmission area, and if the at least one node of the group is discovered, attempting the connection to the group via the discovered node. Two or more target nodes are sequentially configured for a connection.

In one exemplary embodiment, the processor 420 generates an information request signal for requesting a connection to a group and transmits the signal to a discovered node via the communication module 450, and receives an information response signal including information on nodes configured for a connection to the group from the discovered node via the communication module 450.

In one exemplary embodiment, if the information response signal is not received from the discovered node during a specific time period, the processor 420 retransmits the information request signal to the discovered node via the communication module 450.

In one exemplary embodiment, if the center node is discovered within a determined range, the processor 420 transmits a group information request signal to the center node via the communication module 450, and receives a group information response signal from the discovered center node in response to the group information request signal via the communication module 450. The group information response signal includes node information indicating a node configured for a connection to a group.

In one embodiment, if a plurality of normal nodes are discovered within the determined range, the processor 420 selects any one normal node on the basis of the number of nodes connected to each normal node, and attempts a connection to the group via the selected node.

In another embodiment, if the plurality of normal nodes are discovered within the determined range, the processor 420 selects any one normal node on the basis of the number of nodes connected to each normal node and the number of hops from a center node and a source node in the group, and attempts a connection to the group via the selected node.

In another embodiment, if the plurality of normal nodes are discovered within the determined range, the processor 420 selects any one normal node on the basis of the number of nodes connected to each normal node, the number of hops from the source node in the group to each of the normal nodes, and strength of a received signal from each of the normal nodes, and attempts a connection to the group via the selected node.

In one embodiment, if a normal node is discovered within a determined range, the processor 420 generates a center node information request signal for requesting information of a center node and then transmits it to the normal node via the communication module 450, receives a center node information response signal from the normal node in response to the center node information request signal via the communication module 450, generates a group information request signal and then transmits it to the normal node via the communication module 450, and receives a group information response signal from the normal node in response to the group information request signal via the communication module 450. The group information response signal includes node information indicating a node configured for a connection to a group.

In one exemplary embodiment, the processor 420 attempts a connection to the group via the discovered node if it is checked that the node can join the group. The checking of whether the node can join the group is performed by a node different from the discovered node for triggering a connection request by a user or the discovered node included in the group.

Returning to FIG. 7, in a wireless communication system including a group formed by one center node 100 and at least one normal node, the normal node 120 includes: the communication module 450 for receiving a request for connecting to the group from at least one target node 170 located within a predetermined transmission area; and the processor 420 for configuring a connection of the target node 170 to the group through communications with the center node 100.

In one exemplary embodiment, the processor 420 receives a center node information request signal for requesting information of the center node from the target node via the communication module 450, generates a center node information response signal in response to the center node information request signal and then transmits it to the target node via the communication module 450, receives a group information request signal from the target node via the communication module 450, generates a group information request signal in response to the received group information request signal and then transmits it to the center node via the communication module 450, receives a group information response signal including node information, which is generated by the center node in response to the receiving of the group information request signal and in which the target node is added, from the center node via the communication module 450

In one exemplary embodiment, if the target node is a target node which can join the group, the processor 420 configures a connection of the target node to the group through communications with the center node. The checking of whether the target node is the target node which can join the group may be performed by a normal node for triggering a connection request by a user or other nodes joined to the group.

In one exemplary embodiment, the communication module 450 further performs an operation of providing the target node with at least one of information on the number of connected nodes and information on the number of hops from the center node or the source node in the group.

As described above, exemplary embodiments of the present invention provide convenience in that, when a wireless communication system configures a connection of a plurality of wireless devices (or nodes), the connection configuration is automatically achieved by only performing triggering for the connection configuration by a user. Further, since there is no need to wait for a predetermined time (i.e., a walk time) for each target node when configuring a connection of two or more target nodes within the predetermined time, it is possible to decrease a time required when configuring the connection of the two or more target nodes. Furthermore, when configuring a network by connecting the plurality of wireless devices in a multi-hop manner, the connection configuration may be achieved by only triggering any device in a network group. In addition, by considering the number of currently connected nodes and the number of hops from a center node or a source node in a process of selecting a node to be connected from among discovered nodes, all terminals can receive a service reliably in a multi-hop network.

While the present invention has been particularly shown and described with reference to exemplary embodiments thereof, it will be understood by those skilled in the art that various modifications and changes in form and details may be made therein without departing from the spirit of the invention. For example, although it is described a case where a connection configuration operation is performed by a network group having the structure of FIG. 1 and FIG. 11 for example in exemplary embodiments of the present invention, the scope of the present invention is not necessarily limited thereto, and thus the connection configuration operation may also be equally performed by various forms of network groups according to the exemplary embodiments of the present invention. For another example, although it is described a case where a connection configuration operation is performed by nodes including the components of FIG. 6 and FIG. 7 for example in exemplary embodiments of the present invention, the scope of the present invention is not necessarily limited thereto, and thus the connection configuration operation may also be equally performed by nodes configured of other forms. The connection configuration operations according to exemplary embodiments of the present invention may be implemented by using a single controller. In this case, a program instruction for performing an operation implemented with various computers may be recorded in a computer readable recording medium. The computer readable recording medium may include a program instruction, a data file, a data structure, etc., in an independent or combined manner. The program instruction may be designed and configured particularly for the present invention, or may be known and usable to those ordinarily skilled in the art. The computer readable recording medium may be a hardware device configured particularly to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. When a base station or a relay described in the present invention is entirely or partially implemented with a computer program, a computer readable recording medium which stores the computer program is also included in the present invention. Therefore, the scope of the invention is defined not by the detailed description of the invention but by the appended claims, and all differences within the scope will be construed as being included in the present invention.

The invention claimed is:

1. An apparatus of a first node in a wireless communication system, the apparatus comprising:
a transceiver; and
at least one processor operatively coupled to the transceiver,
wherein the at least one processor is configured to:
perform a connection procedure with a second node,
receive a request message for capability information of an access point (AP) from the second node,
transmit a first response message comprising the capability information of the AP to the second node,
receive, from the second node, a message for requesting information associated with a group in which the first node is included, wherein the group is configured by an AP,
transmit, to the AP, the message for requesting information associated with the group,
receive, from the AP, a second response message comprising the information associated with the group, wherein the second response message includes an updated group information list comprising the second node, wherein the second response message is transmitted from the AP to the first node and a third node simultaneously, wherein the third node is included in the updated group information list and is within a predetermined transmission area from the AP, and
transmit, to the second node and a fourth node simultaneously, the second response message comprising the information associated with the group, wherein the fourth node is included in the updated group information list and is within a predetermined transmission area from the first node.

2. The apparatus of claim 1, wherein the at least one processor is further configured to:
receive, from the second node, a message comprising information associated with the second node;
transmit, to the second node, a message comprising information associated with the first node;
receive, from the second node, a request message for authentication; and
transmit, to the second node, a response message for the authentication.

3. The apparatus of claim 2,
wherein the information associated with the first node includes at least one of a number of nodes connected to the first node, a number of hops from the AP, and a number of hops from a source node, and
wherein the information associated with the second node includes at least one of a number of nodes connected to the second node and a number of hops from the AP.

4. The apparatus of claim 1, wherein the at least one processor is further configured to:
update node information, indicating nodes included in the group by adding the second node to the node information in response to the receiving of the message for requesting information associated with the group, and
transmit, to the second node, the information associated with the group containing the updated node information.

5. The apparatus of claim 1, wherein the at least one processor is further configured to:

if a plurality of request messages for performing the connection procedure are received from a plurality of nodes, select a fifth node among the plurality of nodes; and perform the connection procedure with the selected fifth node.

6. The apparatus of claim 5, wherein the at least one processor is further configured to:

transmit, to the selected fifth node, response message for performing the connection procedure.

7. The apparatus of claim 5, wherein the at least one processor is further configured to:

store the plurality of request messages for performing the connection procedure;

select a sixth node among the plurality of nodes except from the selected fifth node based on the stored plurality of request messages; and perform the connection procedure with the selected sixth node.

8. An apparatus of a second node in a wireless communication system, the apparatus comprising:

a transceiver; and at least one processor operatively coupled to the transceiver, wherein the at least one processor is configured to:

if a first node included in a group is detected, perform a connection procedure with the first node, wherein the group is configured by an access point (AP);

transmit a request message for capability information of the AP to the first node;

receive a response message comprising the capability information of the AP from the first node;

transmit, to the first node, a request message for requesting information associated with the group; and receive, from the first node, a response message comprising the information associated with the group, wherein the information associated with the group includes an updated group information list comprising the second node, wherein the response message is transmitted from the AP to the first node and a third node simultaneously, wherein the third node is included in the updated group information list and is within a predetermined transmission area from the AP, wherein the response message is transmitted from the first node to the second node and a fourth node simultaneously, and wherein the fourth node is included in the updated group information list and is within a predetermined transmission area from the first node.

9. The apparatus of claim 8, wherein the connection procedure is triggered by a user input of the second node.

10. The apparatus of claim 8, wherein the at least one processor is further configured to:

transmit, to the first node, a message comprising information associated with the second node;

receive, from the first node, a message comprising information associated with the first node;

determine whether the connection procedure with the first node is available;

transmit, to the first node, a request message for authentication; and receive from the first node, a response message for the authentication.

11. The apparatus of claim 10, wherein the information associated with the second node includes at least one of a number of nodes connected to the second node, a number of hops from the AP, and a number of hops from a source node, and wherein the information associated with the first node includes at least one of a number of nodes connected to the first node and a number of hops from the AP.

12. The apparatus of claim 8, wherein the at least one processor is further configured to:

if a plurality of nodes included in the group are detected, select one node among the plurality of nodes based on a reception signal from each of the plurality of nodes.

13. The apparatus of claim 8, wherein the at least one processor is further configured to:

if a plurality of nodes included in the group is detected, select one node among the plurality of nodes based on at least one of a number of hops from the AP to each of the plurality of nodes, a number of hops from a source node to each of the plurality of nodes, and a number of connected nodes to each of the plurality of nodes.

14. The apparatus of claim 10, wherein the at least one processor is further configured to:

if the first node completes the connection procedure with the second node, retransmit, to the first node, the message comprising the information associated with the second node.

15. A method for operating a second node in a wireless communication system, the method comprising:

if first node included in a group is detected, performing a connection procedure with the first node, wherein the group is configured by an access point (AP);

transmitting a request message for capability information of the AP from the first node;

receiving a response message comprising the capability information of the AP to the first node;

transmitting, to the first node, a request message for requesting information associated with the group; and receiving, from the first node, a response message comprising the information associated with the group, wherein the information associated with the group includes an updated group information list comprising the second node, wherein the response message is transmitted from the AP to the first node and a third node simultaneously, wherein the third node is included in the updated group information list and is within a predetermined transmission area from the AP, wherein the response message is transmitted from the first node to the second node and a fourth node simultaneously, and wherein the fourth node is included in the updated group information list and is within a predetermined transmission area from the first node.

16. The method of claim 15, further comprising:

transmitting, to the first node, a message comprising information associated with the second node;

receiving, from the first node, a message comprising information associated with the first node;

determining whether the connection procedure with the first node is available;

transmitting, to the first node, a request message for authentication; and receiving from the first node, a response message for the authentication.

17. The method of claim 15, further comprising:
if a plurality of nodes included in the group are detected, selecting one node among the plurality of nodes based on a reception signal from each of the plurality of nodes.

\* \* \* \* \*